United States Patent
Park et al.

(10) Patent No.: US 12,175,508 B2
(45) Date of Patent: Dec. 24, 2024

(54) METHOD AND APPARATUS FOR MANAGING FABRIC SUPPLIER TERMINALS AND FABRIC BUYER TERMINALS USING A PLURALITY OF NEURAL NETWORK

(71) Applicant: NPTI GLOBAL CO., LTD., Seoul (KR)

(72) Inventors: Gyu Ri Park, Seoul (KR); Woo Sig Jung, Goyang-si (KR)

(73) Assignee: NPTI GLOBAL CO., LTD, Seoul (KR)

( * ) Notice: Subject to any disclaimer, the term of this patent is extended or adjusted under 35 U.S.C. 154(b) by 119 days.

(21) Appl. No.: 18/181,062

(22) Filed: Mar. 9, 2023

(65) Prior Publication Data

US 2024/0242256 A1 Jul. 18, 2024

(30) Foreign Application Priority Data

Jan. 18, 2023 (KR) .................. 10-2023-0007357

(51) Int. Cl.
*G06Q 30/00* (2023.01)
*G06Q 30/0282* (2023.01)
*G06Q 30/0601* (2023.01)

(52) U.S. Cl.
CPC ..... *G06Q 30/0605* (2013.01); *G06Q 30/0282* (2013.01); *G06Q 30/0627* (2013.01)

(58) Field of Classification Search
None
See application file for complete search history.

(56) References Cited

U.S. PATENT DOCUMENTS

2003/0233305 A1\* 12/2003 Solomon ............... G06Q 30/06
705/37
2019/0037357 A1\* 1/2019 Bijor ..................... H04L 67/63

\* cited by examiner

*Primary Examiner* — Mila Airapetian
(74) *Attorney, Agent, or Firm* — Sughrue Mion, PLLC

(57) ABSTRACT

Disclosed herein are a method and apparatus for managing fabric supplier terminals and fabric buyer terminals using a plurality of neural networks. According to an embodiment, the server may manage the fabric supplier terminals and fabric buyer terminals by using a plurality of neural networks. For example, the server may determine a plurality of supplier groups matched with a fabric buyer terminal through a matching model using a plurality of neural networks based on estimate information, information about fabric suppliers, and information about fabrics. For example, the server may group and match fabric suppliers capable of supplying corresponding fabrics in consideration of a country or region.

5 Claims, 6 Drawing Sheets

METHOD AND APPARATUS FOR MANAGING FABRIC SUPPLIER TERMINALS AND FABRIC BUYER TERMINALS USING A PLURALITY OF NEURAL NETWORK

CROSS-REFERENCE TO RELATED APPLICATION

This application claims priority to and the benefit of Korean Patent Application No. 10-2023-0007357, filed on Jan. 18, 2023, the disclosure of which is incorporated herein by reference in its entirety.

BACKGROUND

1. Field of the Invention

Embodiments of the present disclosure relate to technology for managing fabric supplier terminals and the fabric buyer terminals, and more particularly, technology for managing the fabric supplier terminals and the fabric buyer terminals using a plurality of neural networks.

2. Description of the Related Art

The transaction of the fabric varies depending on the region where the transaction is made and the transaction parties. In particular, when trade transactions are made between countries, the import and export approval, and a report and invoice or packing list must be prepared. In addition, as the bill of lading or air waybill, which proves that the cargo is loaded according to the means of transporting the fabric, are involved, the procedure is more complicated than domestic fabric transactions. It is not as simple as domestic fabric transactions because the collection of payments according to delivery of cargo is made through foreign exchange banks, not directly between the parties.

As such, due to the complexity of the process of trading fabrics between countries, documents to be prepared are issued by various institutions, and the receipt is made offline. As a result, it takes a considerable amount of time to prepare documents, and it is difficult to proceed with safe transactions.

Because quality fabrics are often produced on a small scale and it is difficult to check information about fabric suppliers in each country, buyers who order large-scale fabrics often order fabrics from fabric suppliers that meet fabric orders while accepting the quality lowered to a certain extent in order to secure the volume of orders. Accordingly, there is a need for an online platform to broker and match transactions between fabric importers and fabric suppliers that exist in each country.

Therefore, there is a need for a method to match fabric buyers and fabric suppliers worldwide based on big data, recommend companies related to fabric exports to fabric buyers and fabric suppliers, and manage fabric buyers and fabric suppliers for safe trade.

SUMMARY OF THE INVENTION

Embodiments of the present disclosure may provide a method and apparatus for managing fabric supplier terminals and fabric buyer terminals using a plurality of neural networks.

Objects to be achieved in the embodiments are not limited to those mentioned above, and other objects will become apparent to those of ordinary skill in the art from various embodiments of the present disclosure described below.

In accordance with the present disclosure, the above and other objects can be accomplished by the provision of a method for managing fabric supplier terminals and fabric buyer terminals by a server using a plurality of neural networks. The method may include receiving information about a fabric supplier from each of a plurality of first fabric supplier terminals, determining a first screening score for each of the plurality of first fabric supplier terminals based on the information about the fabric supplier, receiving information about fabrics from at least one second fabric supplier terminal having the first screening score greater than or equal to a preset first score among the plurality of first fabric supplier terminals, receiving information about a fabric buyer from each of a plurality of first fabric buyer terminals, determining a second screening score for each of the plurality of first fabric buyer terminals based on the information about the fabric buyers, receiving estimate information about a fabric from a second fabric buyer terminal having the second screening score greater than or equal to a preset second score among the plurality of first fabric buyer terminals, determining a plurality of supplier groups matching the second fabric buyer terminal through a matching model using a plurality of neural networks based on the estimate information, the information about the fabric supplier of the second fabric supplier terminal, and the information about the fabrics of the second fabric supplier terminal, each of the plurality of supplier groups including one or more third fabric supplier terminals capable of supplying more than a volume of order of at least one purchased fabric included in the estimate information, transmitting information about the plurality of supplier groups to the second fabric buyer terminal, receiving, from the second fabric buyer terminal, information indicating a first supplier group, the first supplier group being one of the plurality of supplier groups, transmitting an order message containing the estimate information about the fabric to the first supplier group, based on the order message being transmitted, initiating a fabric export session for the second fabric buyer terminal and the first supplier group, based on receiving a completion message indicating that fabric export is completed from the second fabric buyer terminal, terminating the fabric export session.

The information about the fabric supplier may include information about a business registration number, location information about the fabric supplier, information about types of fabrics handled by the fabric supplier, information related to production equipment of the fabric supplier, information about a suppliable amount of each of the fabrics, and information about a transaction history of the fabric supplier, and information about types of the fabrics suppliable by the fabric supplier through collaboration with another fabric supplier, The information about the fabric buyer may include information about a data universal numbering system (DUNS) number, location information about the fabric buyer, information about types of fabrics purchased by the fabric buyer, information related to total assets of the fabric buyer, and information about a transaction history of the fabric buyer.

The first screening score may be determined according to presence or absence of the business registration number of the fabric supplier, average sales of the fabric supplier for a preset period, the number of transactions of the fabric supplier, a daily production amount of each of the fabrics, the suppliable amount of each of the fabrics, and the number of the types of the fabrics suppliable by the fabric supplier through collaboration with the other fabric supplier.

The second screening score may be determined according to presence or absence of the DUNS number of the fabric buyer, an average amount of purchase of the fabric buyer for a preset period, the number of transactions of the fabric buyer, the total assets of the fabric buyer, an amount of each of the fabrics purchased by the fabric buyer, and a country or region of the fabric buyer.

The information about the fabrics may include information about a type of the fabrics supplied, information about a material of the fabrics supplied, information about a color of the fabrics supplied, information about a pattern of the fabrics supplied, information about a width of the fabrics supplied, information about weight of the fabrics supplied, information about a price of the fabrics supplied, information about a sample image of the fabrics supplied, and information about a suppliable amount of the fabrics supplied.

The estimate information may include information about a type of the purchased fabric, information about a material of the purchased fabric, information about a color of the purchased fabric, information about a pattern of the purchased fabric, information about a width of the purchased fabric, and information about weight of the purchased fabric, information about a delivery date of the purchased fabric, and information about the volume of order of the purchased fabric.

According to one embodiment, a first vector for each of the at least one second fabric supplier terminal may be generated through data preprocessing of the information about the fabrics. The first vector may include a value related to the type of the fabrics supplied, a value related to the material of the fabrics supplied, values related to the color and pattern of the fabrics supplied, a value of the width of the fabrics supplied, and a value of the weight of the fabrics supplied. A first reduced vector may be generated for the first vector through a principal component analysis. N similar groups may be determined by applying a Density-Based Spatial Clustering of Applications with Noise (DBSCAN) technique to the plurality of first reduced vectors for all of the at least one second fabric supplier terminal. Different recommendation information may be transmitted for each of the n similar groups. The recommendation information may include information about a trends of yarn prices, information about yarn companies, information about weaving companies, information about dyeing companies, and information about packaging companies.

The fabric export session may include transmitting, to the second fabric buyer terminal and the first supplier group, information about a contract prepared according to the information about the fabric buyer of the second fabric buyer terminal, the information about the fabric suppliers for the first supplier group, the information about the fabrics, and the estimate information, transmitting a document related to telegraphic transfer according to the information about the contract to the second fabric buyer terminal and the first supplier group, transmitting information about a work instruction received from the second fabric buyer terminal to the first supplier group, transmitting work information received from the first supplier group to the second fabric buyer terminal, transmitting an inspection result for the fabrics received from the first supplier group to the second fabric buyer terminal, transmitting information about a transport schedule of the fabrics produced by the first supplier group and information about a shipping document to the second fabric buyer terminal, transmitting information about a document related to a final payment according to the information about the contract to the first supplier group, transmitting a document related to delivery completion by courier to the first supplier group and the second fabric buyer terminal, and receiving information about feedback from each of the first supplier group and the second fabric buyer terminal.

The plurality of neural networks may include a first neural network and a second neural network.

A first base vector may be generated for each of the at least one purchased fabric through data preprocessing based on the estimate information, the first base vector including a value related to a type of the purchased fabric, a value related to a material of the purchased fabric, a value related to a color of the purchased fabric, a value related to a pattern of the purchased fabric, a value related to a width of the purchased fabric, a value of weight of the purchased fabric, and a value for the volume of the order of the purchased fabric. A first reference vector may be generated for each of the at least one second fabric supplier terminal through data preprocessing based on the information about the fabrics, the first reference vector including the value related to the type of the fabrics supplied, the value related to the material of the fabrics supplied, the value related to the color of the fabrics supplied, the value related to the pattern of the fabrics supplied, the value of the width of the fabrics supplied, and the value of the weight of the fabrics supplied. Based on the first base vector and the first reference vector being input to the first neural network, a plurality of third fabric supplier terminals capable of supplying the purchased fabric included in the estimate information may be determined. The first neural network may include a first input layer, one or more first hidden layers, and a first output layer.

Each of learning data including the first base vectors, the first reference vectors, and answer similarity may be input to the first input layer of the first neural network and output as a first output vector through the one or more first hidden layers and the first output layer. The first output vector may be input to a first loss function layer connected to the first output layer. The first loss function layer may output a first loss value using a first loss function to configured to compare the first output vector and a first answer vector for each of the learning data, and a parameter of the first neural network may be trained to reduce the first loss value.

A second base vector including the value for the volume of order of each of the at least one purchased fabric and a value matched to the country or region of the fabric buyer may be generated through data preprocessing based on the information about the fabric buyer and the estimate information. An input vector may be generated for each of the at least one purchased fabric through data preprocessing based on information about fabric suppliers of the plurality of third fabric supplier terminals, the input vector including identification values for the plurality of third fabric supplier terminals, values matched to countries or regions for the plurality of third fabric supplier terminals, average sales of the plurality of third fabric suppliers for a preset period, the number of transactions of the plurality of third fabric suppliers, an available amount of supply of the plurality of third fabric suppliers, and a value related to collaboration of the plurality of third fabric suppliers. Based on the input vectors and the second base vectors being input to the second neural network, a plurality of supplier groups matching the second fabric buyer terminal may be determined.

The second neural network may include a second input layer, one or more second hidden layers, and a second output layer. Each of learning data including the plurality of input vectors, the plurality of second base vectors, and a vector for an answer plurality of supplier groups may be input to the second input layer of the second neural network, and output as a second output vector through the one or more second hidden layers and the second output layer. The second output vector may be input to a second loss function layer connected to the second output layer. The second loss function layer outputs a second loss value using a second loss function configured to compare the second output vector and a second answer vector for each of the learning data, and a parameter of the second neural network may be trained to reduce the second loss value.

In addition, for example, the first screening score may be determined by the following equation.

$$S_1 = \frac{a}{k} * \left(1 + \frac{n_t + m_s + 8 * n_t * m_s}{(4 * n_t + 1) * (4 * m_s + 1)}\right) * \sum_{i=1}^{k} \frac{100 * a_i * f_i}{fm_i}$$

In the equation, $S_1$ may be the first screening score, a may be the weight related to the business registration number, $n_t$ may be the total number of transactions of the fabric supplier, $m_s$ may be the average sales of the fabric supplier for a preset period, and k may be the number of fabrics handled by the fabric supplier. Also, the $f_i$ may be a suppliable amount of the i-th fabric, $fm_i$ may be a minimum expected amount of purchase of the i-th fabric, and $\alpha_i$ may be a weight related to collaboration on the i-th fabric.

A weight related to the business registration number may be 0 or 1. For example, when the business registration number is not present, the weight may be determined to be 0. When the business registration number is present, the weight may be determined to be 1.

The weight associated with the collaboration on the i-th fabric may be determined to be 1 when the i-th fabric is not a fabric that is suppliable together with other fabric suppliers. The weight associated with the collaboration on the i-th fabric may be determined to be a value between 1 and 2 depending on the number of pieces of production equipment of the fabric supplier, when the i-th fabric is suppliable together with other fabric suppliers. For example, as the number of pieces of production equipment increases, the weight may be determined to be a value closer to 2.

In addition, for example, the second screening score may be determined by the following equations.

$$S_2 = \frac{d}{l} * \left(1 + \frac{n_t + p_s + 8 * n_t * p_s}{(4 * n_t + 1) * (4 * p_s + 1)}\right) * \sum_{j=1}^{l} \frac{100 * \gamma_j * b_j}{fm_j}$$

In the equation, $S_2$ may be the second screening score, a may be the weight related to the DUNS number, $n_t$ may be the total number of transactions of the fabric buyer, $m_s$ is the average purchase amount of the fabric buyer for a preset period, and l may be the number of fabrics purchased by the fabric buyer. Also, $b_j$ may be the amount of purchase of the j-th fabric, the $fm_j$ may be a minimum expected amount of purchase of the j-th fabric, and $\gamma_j$ may be a weight related to the country or region where the j-th fabric is received.

The weight related to the DUNS number may be 0 or 1. For example, when the DUNS number is not present, the weight may be determined to be 0. When the DUNS number is present, the weight may be determined to be 1. The weight related to the country or region where the j-th fabric is received may be determined to be 1 to 2. For example, as the distance between the country or region where the fabric is received and a factory producing the fabric is far and it is difficult to export the fabric to the country or region, the weight may be determined to a value closer to 2. For example, the amount of purchase of the j-th fabric may be the total weight of the fabric purchased by the fabric buyer. For example, the minimum expected amount of purchase of the j-th fabric may be a value preset in the server. The minimum expected amount of purchase is the minimum expected amount of purchase that the buyer desires. The minimum expected amount of purchase matched with each type of fabric may be preset in the server. For example, the minimum expected amount of purchase matched with each type of fabric may be determined by the server based on the information about the transaction history of the fabric buyer terminal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

The following embodiments are combinations of components and features of the embodiments in a predetermined form. Each component or feature may be considered optional unless explicitly stated otherwise. Each component or feature may be implemented without being combined with other components or features. In addition, various embodiments may be configured by combining some components and/or features. The order of operations described in various embodiments may be changed. Some components or features of one embodiment may be included in another embodiment, or may be replaced with corresponding components or features of another embodiment.

In the description of the drawings, procedures or steps that may obscure the gist of various embodiments are not described, and procedures or steps that may be understood by those skilled in the art are not described.

Throughout the specification, when a part "includes" or "comprises" a component, the part may further include other components, and such other components are not excluded unless there is a particular description contrary thereto. Terms such as "unit," "-er," and "module," refer to units for processing at least one function or operation, which may be implemented by hardware, software, or a combination thereof. As used herein, articles "a or an," "one," "the," and the like are intended to include both the singular form and the plural form in the context of describing various embodiments (particularly in the context of the accompanying claims) unless otherwise indicated or clearly contradicted by context.

Hereinafter, embodiments according to various examples will be described in detail with reference to the accompanying drawings. The detailed description set forth below in conjunction with the accompanying drawings is intended to describe exemplary embodiments of various examples, and is not intended to present one and only one embodiment.

In addition, specific terms used in various embodiments are provided to facilitate understanding of various embodiments. These specific terms may be changed into other forms without departing from the spirit of various embodiments.

Figure 1:
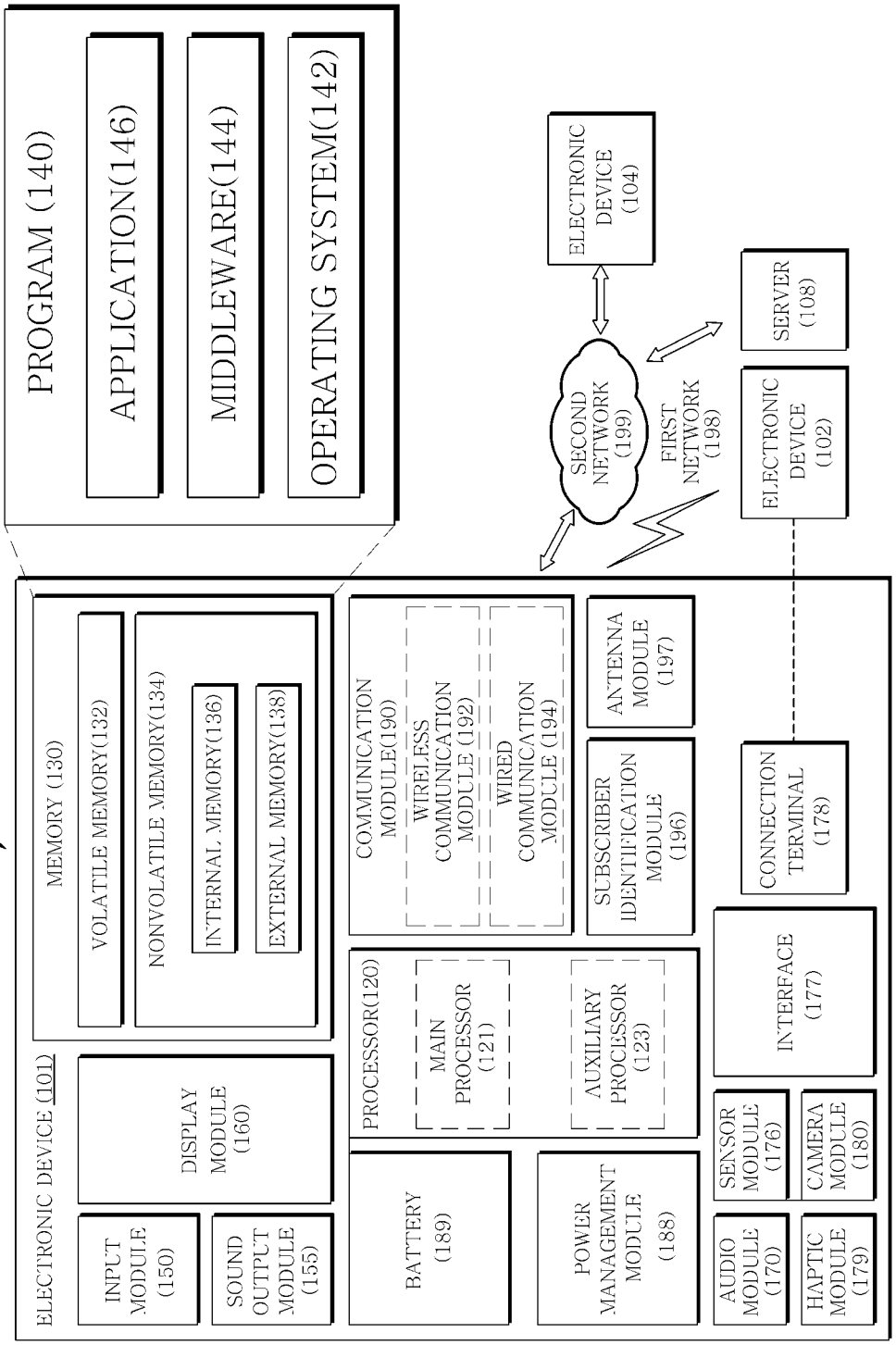
FIG. 1 is a diagram illustrating a configuration of an electronic device according to an embodiment.

FIG. 1 is a diagram illustrating a configuration of an electronic device according to an embodiment.

FIG. 1 is a block diagram of an electronic device 101 in a network environment 100 according to various embodiments. Referring to FIG. 1, in the network environment 100, the electronic device 101 may communicate with an electronic device 102 over a first network 198 (e.g., a short-range wireless communication network), or with at least one of an electronic device 104 or a server 108 over a second network 199 (e.g., a remote wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In some embodiments, in the electronic device 101, at least one of these components may be omitted or one or more other components may be added. In some embodiments, some of these components (e.g., the sensor module 176, the camera module 180, or the antenna module 197) may be integrated into one component (e.g., the display module 160). The electronic device 101 may be referred to as a client, a terminal or a peer.

The processor 120 may control at least one other component (e.g., hardware or software component) of electronic device 101 connected to processor 120 by executing software (e.g., the program 140) and may perform various data processing or operations. According to an embodiment, as at least part of the data processing or operation, the processor 120 may store instructions or data received from other components (e.g., the sensor module 176 or the communication module 190) in a volatile memory 132, process the instructions or data stored in volatile memory 132, and store the result data in a nonvolatile memory 134. According to an embodiment, the processor 120 may include a main processor 121 (e.g., a central processing unit or an application processor) or an auxiliary processor 123 (e.g., a graphic processing unit, a neural processing unit (NPU), an image signal processor, a sensor hub processor, or a communication processor). For example, when the electronic device 101 includes the main processor 121 and the auxiliary processor 123, the auxiliary processor 123 may use lower power than the main processor 121 or may be set to specialize in a specified function. The auxiliary processor 123 may be implemented separately from the main processor 121 or as a part thereof.

The auxiliary processor 123 may control at least some of functions or states related to at least one of the components of the electronic device 101 (e.g., the display module 160, the sensor 176, or the communication module 190) on behalf of the main processor 121 while the main processor 121 is in an inactive (e.g., sleep) mode, or in cooperation with the main processor 121 while the main processor 121 is in an active (e.g., application execution) mode. According to an embodiment, the auxiliary processor 123 (e.g., an image signal processor or a communication processor) may be implemented as part of other functionally related components (e.g., the camera module 180 or the communication module 190). According to an embodiment, the auxiliary processor 123 (e.g., a neural processing unit) may include a hardware structure specialized in processing an artificial intelligence model.

The artificial intelligence model may be generated through machine learning. This learning may be performed by, for example, the electronic device 101 where the artificial intelligence model is performed, or may be performed through a separate server (e.g., the server 108). Learning algorithms may include, for example, supervised learning, unsupervised learning, semi-supervised learning, or reinforcement learning, but are not limited to the examples mentioned above. The artificial intelligence model may include a plurality of artificial neural network layers. The artificial neural network may be one of a deep neural network (DNN), a convolutional neural network (CNN), a recurrent neural network (RNN), a restricted bolzmann machine (RBM), a deep belief network (DBN), a bidirectional recurrent deep neural network (BRDNN), deep Q-networks, or a combination of two or more thereof, but are not limited to the examples mentioned above. In addition to the hardware structure, the artificial intelligence model may additionally or alternatively include a software structure.

The memory 130 may store various data used by at least one component of the electronic device 101 (e.g., the processor 120 or the sensor module 176). The data may include, for example, software (e.g., the program 140) and input data or output data for instructions related thereto. The memory 130 may include a volatile memory 132 or a nonvolatile memory 134.

The program 140 may be stored as software in the memory 130, and may include, for example, an operating system 142, a middleware 144, or an application 146.

The input module 150 may receive, from the outside (e.g., user) of the electronic device 101, instructions or data to be used in a component of the electronic device 101 (e.g., the processor 120). The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes such as multimedia playback or recording playback. The receiver may be used to receive an incoming call. According to an embodiment, the receiver may be implemented separately from the speaker or as a part thereof.

The display module 160 may visually provide information to the outside (e.g., a user) of the electronic device 101. The display module 160 may include, for example, a display, a hologram device, or a projector and a control circuit for controlling the device. According to an embodiment, the display module 160 may include a touch sensor configured to sense a touch, or a pressure sensor configured to measure the strength of a force generated by the touch.

The audio module 170 may convert sound into an electrical signal, or conversely, convert an electrical signal into sound. According to an embodiment, the audio module 170 may acquire sound through the input module 150, or output sound through an external electronic device (e.g., the electronic device 102) directly or wirelessly connected to the sound output module 155 or electronic device 101.

The sensor module 176 may detect an operating state (e.g., power or temperature) of the electronic device 101 or an external environmental state (e.g., a user state) and generate an electrical signal or data value corresponding to the detected state. According to an embodiment, the sensor module 176 may include, for example, a gesture sensor, a gyro sensor, a barometric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols that may be used for the electronic device 101 to be directly or wirelessly connected to an external electronic device (e.g., the electronic device 102). According to an embodiment, the interface 177 may include, for example, a high definition multimedia interface (HDMI), a universal serial bus (USB) interface, an SD card interface, or an audio interface.

The connection terminal 178 may include a connector through which the electronic device 101 may be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert electrical signals into mechanical stimuli (e.g., vibrations or movements) or electrical stimuli that the user may perceive through touch or motor senses. According to an embodiment, the haptic module 179 may include, for example, a motor, a piezoelectric element, or an electrical stimulation device.

The camera module 180 may capture a still image and a moving image. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a non-rechargeable primary battery, a rechargeable secondary battery, or a fuel cell.

The communication module 190 may support establishing a direct (e.g., wired) communication channel or wireless communication channel between the electronic device 101 and an external electronic device (e.g., the electronic device 102, the electronic device 104, or the server 108), and performing communication on the established communication channel. The communication module 190 may include one or more communication processors that operate independently of the processor 120 (e.g., an application processor) and support direct (e.g., wired) communication or wireless communication. According to an embodiment, the communication module 190 may include a wireless communication module 192 (e.g., a cellular communication module, a short-range wireless communication module, a global navigation satellite system (GNSS) communication module), or a wired communication module 194 (e.g., a local area network (LAN) communication module or a power line communication module). Among these communication modules, a corresponding communication module may communicate with the external electronic device 104 over the first network 198 (e.g., a short-range communication network such as Bluetooth, wireless fidelity (WiFi) direct, or infrared data association (IrDA)) or the second network 199 (e.g., a remote communications network such as a legacy cellular network, a 5G network, a next-generation communications network, the Internet, or a computer network (e.g. LAN or WAN)). These various types of communication modules may be integrated into one component (e.g., a single chip), or may be implemented as multiple separate components (e.g., multiple chips). The wireless communication module 192 may verify or authenticate the electronic device 101 within a communication network such as the first network 198 or the second network 199 based on subscriber information (e.g. International Mobile Subscriber Identifier (IMSI)) stored in the subscriber identification module 196.

The wireless communication module 192 may support a 5G network and a next-generation communication technology after a 4G network, such as, for example, a new radio (NR) access technology. NR connection technology may support high-speed data transmission (enhanced mobile broadband (eMBB)), terminal power minimization, and multiple terminal connections (massive machine type communications (mMTC)), or ultra-reliable and low-latency communications (URLLC). The wireless communication module 192 may support, for example, a high frequency band (e.g., a mmWave band) to achieve a high data transmission rate. The wireless communication module 192 may support various technologies such as beamforming, massive MIMO (multiple-input and multiple-output), full dimensional MIMO (FD-MIMO), array antenna, analog beamforming, or large scale antenna for securing performance in the high frequency band. The wireless communication module 192 may support various requirements specified for the electronic device 101, the external electronic device (e.g., the electronic device 104), or the network system (e.g., the second network 199). According to an embodiment, the wireless communication module 192 may support peak data rate for eMBB realization (e.g., 20 Gbps or more), loss coverage for mMTC realization (e.g., 164 dB or less), or U-plane latency for URLLC realization (e.g., 0.5 ms or less for each of downlink (DL) and uplink (UL), or 1 ms or less for round trip).

The antenna module 197 may transmit or receive a signal or power to or from the outside (e.g., an external electronic device) the signal or power from the external device. According to an embodiment, the antenna module 197 may include an antenna including a radiator composed of a conductor or a conductive pattern formed on a substrate (e.g., a PCB). According to an embodiment, the antenna module 197 may include a plurality of antennas (e.g., array antennas). In this case, at least one antenna suitable for the communication method used in the communication network such as the first network 198 or the second network 199 may be selected from among the plurality of antennas by the communication module 190. The signal or power may be transmitted or received between the communication module 190 and an external electronic device through the selected at least one antenna. According to some embodiments, components other than the radiator (e.g., radio frequency integrated circuit (RFIC)) may be further configured as part of the antenna module 197.

According to various embodiments, the antenna module 197 may form an mmWave antenna module. According to one embodiment, the mmWave antenna module may include a printed circuit board, an RFIC disposed on or adjacent to a first surface (e.g., the bottom surface) of the printed circuit board and capable of supporting a specified high frequency band (e.g., mmWave band), and a plurality of antennas (e.g., array antennas) disposed on or adjacent to a second surface (e.g., the top or side surface) of the printed circuit board and capable of transmitting or receiving signals in the specified high frequency band.

At least some of the components may be connected to each other through a communication method between peripheral devices (e.g., bus, general purge input and output (GPIO), a serial peripheral interface (SPI), or a mobile industry processor interface (MIPI)) and may exchange signals (e.g., instructions or data) with each other.

According to an embodiment, the instructions or data may be transmitted or received between the electronic device 101 and the external electronic device 104 via the server 108 connected to the second network 199. Each of the external electronic devices 102 or 104 may be the same as or different from the electronic device 101. According to an embodiment, all or some of the operations executed in the electronic device 101 may be executed in one or more external electronic devices of the external electronic devices 102, 104, or 108. For example, when the electronic device 101 needs to perform a function or service automatically or in response to a request from a user or another device, the electronic device 101 may request one or more external electronic devices to perform at least a part of the function or service instead of or in addition to executing the same on its own. At least one external electronic device receiving the request may execute at least a part of the requested function or service, or an additional function or service related to the request, and transmit the execution result to the electronic device 101. The electronic device 101 may provide the result as it is or additionally process and provide the result as at least part of a response to the request. To this end, for example, cloud computing, distributed computing, mobile edge computing (MEC), or client-server computing technology may be used. The electronic device 101 may provide an ultra-low latency service using, for example, distributed computing or mobile edge computing. In another embodiment, the external electronic device 104 may include an Internet of things (IoT) device. The server 108 may be an intelligent server using machine learning and/or neural networks. According to one embodiment, the external electronic device 104 or the server 108 may be included in the second network 199. The electronic device 101 may be applied to intelligent services (e.g., smart homes, smart cities, smart cars, or healthcare) based on 5G communication technology and IoT-related technologies.

The server 108 may be connected to the electronic device 101 and provide a service to the connected electronic device 101. In addition, the server 108 may proceed with the membership registration process to store and manage various kinds of information about the user who is registered as a member, and may provide various purchase and payment functions related to the service. In addition, the server 108 may share execution data of a service application executed on each of the plurality of electronic devices 101 in real time such that services may be shared between users. The server 108 may have the same configuration as a conventional web server or service server in terms of hardware. However, in terms of software, the server 108 may include a program module that is implemented in any language, such as C, C++, Java, Python, Golang, or kotlin, and has many functions. In addition, the server 108 is a computer system that is usually connected to an unspecified number of clients and/or other servers over an open computer network such as the Internet, receives requests for execution of tasks from clients or other servers, and derives and provides the results of tasks, and the computer software (server program) installed therefor. In addition to the aforementioned server program, the server 108 should be understood as a broad concept, including a series of application programs running on the server 108 and, in some cases, various databases (DB) built inside or outside the server. Therefore, the server 108 classifies membership information and various kinds of information and data about the game, stores and manages the same in the DB. The DB may be implemented inside or outside the server 108. In addition, the server 108 may be implemented using various server programs that are provided on general server hardware according to operating systems such as Windows, Linux, UNIX, and Macintosh. Typical examples are Internet Information Server (IIS), which is used in Windows environments, and CERN, NCSA, APPACH, and TOMCAT, which are used in UNIX environments. They may be used to implement web services. The server 108 may also be linked with an authentication system and a payment system for user authentication of a service or purchase payment related to the service.

The first network 198 and the second network 199 refer to a connection structure enabling exchange information between nodes such as terminals and servers, or a network connecting the server 108 and the electronic devices 101 and 104. The first network 198 and the second network 199 include, but are not limited to, the Internet, a local area network (LAN), a wireless LAN, a wide area network (WAN), a personal area network (PAN), 3G, 4G, LTE, 5G, and Wi-Fi. The first network 198 and the second network 199 may be a closed first network 198 and second network 199 such as a LAN or a WAN, but are preferably open networks such as the Internet. The Internet refers to the structure of a worldwide open first network 198 and second network 199 that provides various services that exist on protocols such as the TCP/IP protocol, TCP, and user datagram protocol (UDP) and in higher layers: HTTP (HyperText Transfer Protocol), Telnet, FTP (File Transfer Protocol), DNS (Domain Name System), SMTP (Simple Mail Transfer Protocol), SNMP (Simple Network Management Protocol), NFS (Network File Service), and NIS (Network Information Service).

A DB may have a general data structure implemented in the storage space (hard disk or memory) of a computer system using a DB management program (DBMS). The DB may have a data storage form in which data may be freely retrieved (extracted), deleted, edited, and added. The DB may be implemented for the purpose of an embodiment of the present disclosure using relational database management systems (RDBMS) such as Oracle, Infomix, Sybase, and DB2, object-oriented database management systems (OODBMS) such as Gemston, Orion, and O2, and XML Native Databases such as Excelon, Tamino, and Sekaiju, and may have suitable fields or elements to achieve its function.

Figure 2:
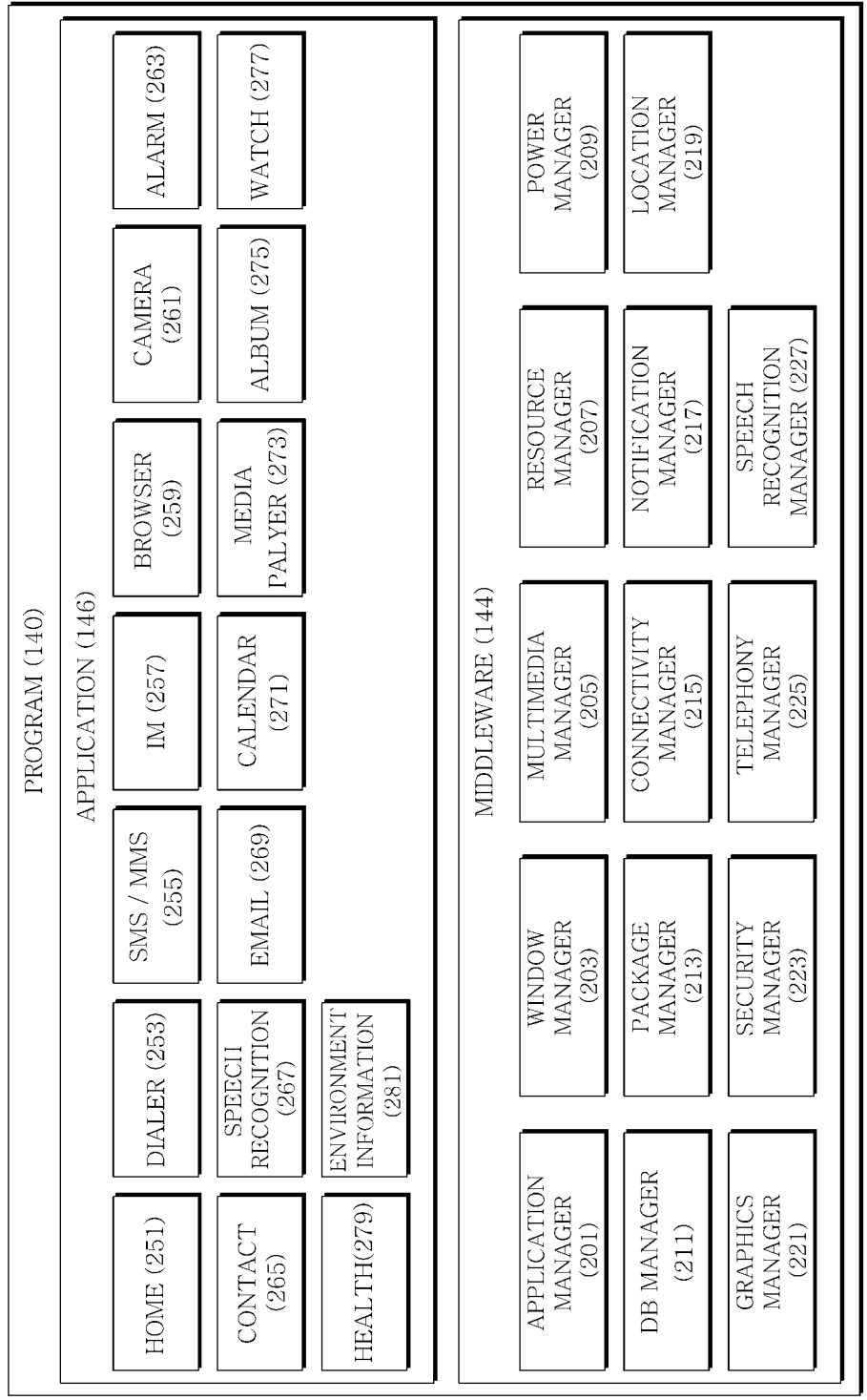
FIG. 2 is a diagram illustrating a configuration of a program according to an embodiment.

FIG. 2 is a diagram illustrating a configuration of a program according to an embodiment.

FIG. 2 is a block diagram 200 illustrating a program 140 according to various embodiments. According to an embodiment, the program 140 may include an operating system 142, middleware 144, or an application 146 executable in the operating system 142 for controlling one or more resources of the electronic device 101. The operating system 142 may include, for example, Android™, iOS™, Windows™, Symbian™, Tizen™, or Bada™. At least a part of the program 140 may be preloaded to the electronic device 101 during manufacture, or downloaded or updated from an external electronic device (e.g., the electronic device 102 or 104 or the server 108) when used by the user. All or part of the program 140 may include a neural network.

The operating system 142 may control management (e.g., allocation or recovery) of one or more system resources (e.g., process, memory, or power) of the electronic device 101. Additionally or alternatively, the operating system 142 may include one or more driver programs for driving other hardware devices of the electronic device 101, such as, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that functions or information provided from one or more resources of the electronic device 101 may be used by the application 146. The middleware 144 may include, for example, an application manager 201, a window manager 203, a multimedia manager 205, a resource manager 207, a power manager 209, a DB manager 211, a package manager 213, a connectivity manager 215, a notification manager 217, a location manager 219, a graphics manager 221, a security manager 223, a telephony manager 225, or a speech recognition manager 227.

The application manager 201 may manage, for example, the life cycle of the application 146. The window manager 203 may manage, for example, one or more GUI resources used on the screen. The multimedia manager 205 may identify, for example, one or more formats necessary for playing media files, and encode or decode the corresponding media file among the media files using a codec suitable for the corresponding format selected from among the formats. The resource manager 207 may manage, for example, the source code of the application 146 or the memory space of the memory 130. The power manager 209 may manage, for example, the capacity, temperature, or power of the battery 189, and determine or provide related information necessary for the operation of the electronic device 101 based on the corresponding information. According to an embodiment, the power manager 209 may be linked with a basic input/output system (BIOS) (not shown) of the electronic device 101.

The DB manager 211 may create, search, or change, for example, a DB to be used by the application 146. The package manager 213 may manage, for example, installation or update of an application distributed in the form of a package file. The connectivity manager 215 may manage, for example, a wireless connection or direct connection between the electronic device 101 and an external electronic device. The notification manager 217 may provide a function for notifying the user of the occurrence of a specified event (e.g., an incoming call, a message, or an alarm). The location manager 219 may manage, for example, location information about the electronic device 101. The graphics manager 221 may manage, for example, one or more graphic effects to be provided to the user or a user interface related thereto.

The security manager 223 may provide, for example, system security or user authentication. The telephony manager 225 may manage, for example, a voice call function or a video call function provided by the electronic device 101. The speech recognition manager 227 may, for example, transmit the user's voice data to the server 108 and receive from the server 108 a instruction corresponding to a function to be performed on the electronic device 101 based at least in part on the voice data, or text data converted based at least in part on the voice data. According to an embodiment, the middleware 244 may dynamically delete some existing components or add new components. According to an embodiment, at least a part of the middleware 144 may be included as a part of the operating system 142, or may be implemented as separate software different from the operating system 142.

The application 146 may include applications such as, for example, Home 251, Dialer 253, Sms/Mms 255, Instant Message 257, Browser 259, Camera 261, Alarm 263, Contact 265, Speech Recognition 267, Email 269, Calendar 271, Media Player 273, Album 275, Watch 277, Health 279 (e.g., measurement of biometric information such as exercise or blood sugar), or Environmental Information 281 (e.g., measurement of air pressure, humidity, or temperature information). According to an embodiment, the application 146 may further include an information exchange application (not shown) capable of supporting information exchange between the electronic device 101 and an external electronic device. The information exchange application may include, for example, a notification relay application configured to transmit information (e.g., calls, messages, or alarms) designated by an external electronic device, or a device management application configured to manage an external electronic device. The notification relay application may transmit notification information corresponding to a designated event (e.g., mail reception) generated by another application (e.g., the email application 269) of the electronic device 101 to an external electronic device. Additionally or alternatively, the notification relay application may receive notification information from an external electronic device and provide the notification information to the user of the electronic device 101.

The device management application may control, for example, the power (e.g., turn-on or turn-off) or function (e.g., brightness, resolution, or focus) of an external electronic device or some components thereof (e.g., a display module or camera module of the external electronic device). Additionally or alternatively, the device management application may support the installation, deletion, or update of an application operating on the external electronic device.

As used herein, a neural network and a network function may have the same meaning. A neural network may consist of a set of interconnected computational units, which may generally be referred to as "nodes." These "nodes" may also be referred to as "neurons". The neural network includes at least two or more nodes. The nodes (or neurons) constituting the neural networks may be interconnected by one or more "links."

Within the neural network, two or more nodes connected through a link may relatively establish a relationship of an input node and an output node. The concept of an input node and an output node is relative. Any node serving as an output node with respect to one node may be an input node with respect to another node, or vice versa. As described above, the input node-to-output node relationship may be created around a link. One or more output nodes may be connected to one input node through a link, and vice versa.

In the relationship between an input node and an output node connected through one link, a value of the output node may be determined based on data input to the input node. Here, a node interconnecting the input node and the output node may have a weight. The weight may be variable, and may be varied by a user or an algorithm in order for the neural network to perform a desired function. For example, when one or more input nodes are connected to one output node by their respective links, the output node may determine the output node value based on the values input to the input nodes connected to the output node and the weights set on the links corresponding to the respective input nodes.

As described above, two or more nodes are interconnected through one or more links to establish form an input node-output node relationship within the neural network. The characteristics of a neural network may be determined according to the number of nodes and links in the neural network, the association between the nodes and the links, and the value of the weight assigned to each of the links. For example, when there are the same number of nodes and links, and two neural network networks with different weights for the links, the two neural network networks may be recognized as different from each other.

Figure 3:
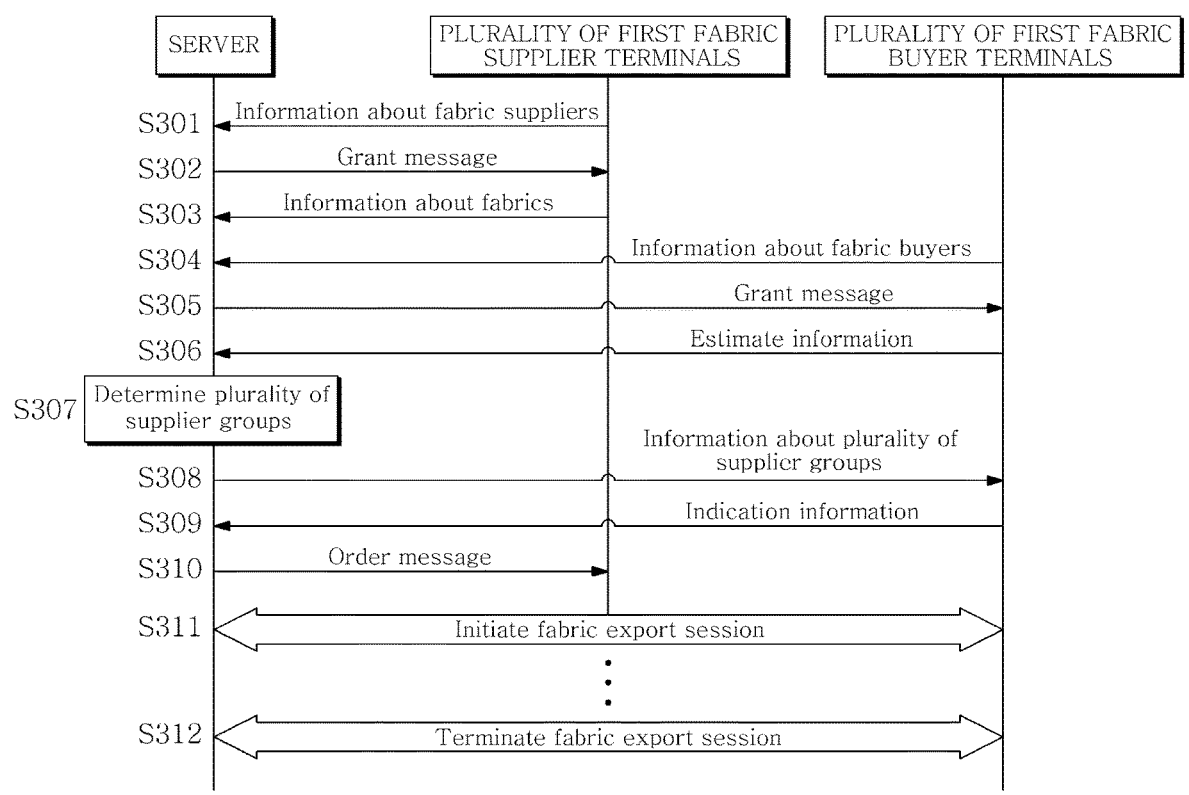
FIG. 3 illustrates a method of managing fabric supplier terminals and fabric buyer terminals by a server using a plurality of neural networks according to an embodiment.

FIG. 3 illustrates a method of managing fabric supplier terminals and fabric buyer terminals by a server using a plurality of neural networks according to an embodiment. The embodiment of FIG. 3 may be combined with various embodiments of the present disclosure.

Referring to FIG. 3, in step S301, a server (e.g., the server 108 of FIG. 1) may receive information about a fabric supplier from each of a plurality of first fabric supplier terminals (e.g., the electronic device 101 of FIG. 1).

Here, the server is a server that manages fabric supplier terminals and fabric buyer terminals. For example, the server may acquire information about fabric suppliers, information about fabric buyers, information about fabrics, and estimate information, match the fabric supplier terminals to the fabric buyer terminals, provide information related to the export of the fabric to the fabric supplier terminals and the fabric buyer terminals, and mediate transactions between the fabric supplier terminals and the fabric buyer terminals. The fabric supplier terminal may be a terminal used by a company that supplies the fabric, and the fabric buyer terminal may be a terminal used by a company that purchases the fabric.

For example, information about the fabric supplier may include information about a business registration number, location information about the fabric supplier, information about the types of fabric handled by the fabric supplier, information related to production equipment of the fabric supplier, information about a suppliable amount of each fabric, information about the transaction history of the fabric supplier, and information about a type of fabric for which the fabric supplier may collaborate with other fabric suppliers.

Here, the business registration number consists of 10 digits. The first 3 digits represent a number for the local code of the competent tax office, the middle 2 digits represent a number for classifying the supplier as an individual or corporation, the leading 4 digits among the last 5 digits represent a serial number assigned in order of registration date, and the following one digit among the last 5 digits represents a number for checking system errors. For example, the server may identify the fabric supplier terminal based on a business registration number stored in the server. The location information about the fabric supplier may be information about an address where a production factory of the fabric supplier is located. For example, the information about the address where the production factory of the fabric supplier is located may include information about the country or region, longitude, and latitude. The information about the types of fabric handled by the fabric supplier may be information indicating the types of fabric produced by the fabric supplier. For example, the types of fabric may include a type of fabric corresponding to natural fibers such as cotton, wool, silk, hemp, linen, or lamie, a type of fabric corresponding to regenerated fibers such as cupra or rayon, a type of fabric corresponding to synthetic fibers such as acrylic, nylon, or acetate, or other synthetic fibers such as polyester, or a type of fabric corresponding to a mix spun with other fibers and synthetic fibers, such as polyester, vinyline, polypropylene, acetate, or triacetate. In this case, a value matching each type of fabric may be pre-stored in the server, and the types of fabric may be distinguished by the values matching the types of the fabric. In addition, when a new fabric is developed, a value matching the new fabric may be added to the server. For example, the information about the types of fabric handled by the fabric supplier may include at least one value matching the types of fabric. Information related to the production equipment of the fabric supplier may include the type of equipment to produce the fabric, the number of pieces of equipment, and the amount of fabric that may be produced through the equipment per day. The information about the suppliable amount of each fabric is information about the amount of each fabric that the fabric supplier can currently supply, and may include a range of the total length or the total weight of the fabric that may be supplied for each fabric. The information about the transaction history of the fabric supplier may include information about the total number of transactions of the fabric supplier and the sales amount of the fabric supplier. The number of transactions may be the number of times the fabric has been supplied to the buyer. Information about types of fabrics suppliable by the fabric supplier through collaboration with other fabric suppliers may include types of fabric that the fabric supplier may produce in collaboration with other fabric suppliers. For example, the information about the types of fabric suppliable by the fabric supplier through collaboration with other fabric suppliers may include at least one value matching the types of fabric.

For example, the server may determine a first screening score for each of the plurality of first fabric supplier terminals based on the information about the fabric supplier. The first screening score may be determined according to presence or absence of the business registration number of the fabric supplier, average sales of the fabric supplier for a preset period, the number of transactions of the fabric supplier, the number of pieces of production equipment for each fabric, the suppliable amount of each fabric, and the number of the types of the fabrics suppliable by the fabric supplier through collaboration with the other fabric suppliers.

Additionally, for example, the first screening score may be determined by Equation 1 below.

$$S_1 = \frac{\alpha}{k} * \left(1 + \frac{n_t + m_s + 8 * n_t * m_s}{(4 * n_t + 1) * (4 * m_s + 1)}\right) * \sum_{i=1}^{k} \frac{100 * \alpha_i * f_i}{fm_i} \quad \text{[Equation 1]}$$

In Equation 1, $S_1$ may be the first screening score, a may be the weight related to the business registration number, $n_t$ may be the total number of transactions of the fabric supplier, $m_s$ may be the average sales of the fabric supplier for a preset period, and k may be the number of fabrics handled by the fabric supplier. Also, the $f_i$ may be a suppliable amount of the i-th fabric, $fm_i$ may be a minimum expected amount of purchase of the i-th fabric, and $α_i$ may be a weight related to collaboration on the i-th fabric.

A weight related to the business registration number may be 0 or 1. For example, when the business registration number is not present, the weight may be determined to be 0. When the business registration number is present, the weight may be determined to be 1.

The weight associated with the collaboration on the i-th fabric may be determined to be 1 when the i-th fabric is not a fabric that is suppliable together with other fabric suppliers. The weight associated with the collaboration on the i-th fabric may be determined to be a value between 1 and 2 depending on the number of pieces of production equipment of the fabric supplier, when the i-th fabric is suppliable together with other fabric suppliers. For example, as the number of pieces of production equipment increases, the weight may be determined to be a value closer to 2.

For example, the suppliable amount of the i-th fabric may be determined as a median value for the range of total weight of the currently suppliable fabric. For example, when the total weight of the currently suppliable fabric ranges from 200 kg to 400 kg, the suppliable amount of the fabric may be determined to be 300 kg, which is the median value.

For example, the minimum expected purchase amount of the i-th fabric may be a value preset in the server. The minimum expected purchase amount is the minimum expected purchase amount that the buyer desires, and the minimum expected purchase amount matched with each type of fabric may be preset in the server. For example, the minimum expected purchase amount matched with each type of fabric may be determined by the server based on information about the transaction history of the fabric buyer terminal.

Additionally, for example, the smallest purchase amount among the purchases of a plurality of fabric buyer terminals registered in the server may be set as a default value for obtaining the minimum expected purchase amount. The default value may be set for each type of fabric. The server may determine the minimum expected purchase amount by applying a weight associated with the number of times the fabric has been traded for a preset period (e.g., a period of six months prior to the present) for the default value. The number of times the fabric has been traded for the preset period (e.g., a period of six months prior to the present) may be determined based on information about the transaction history of the fabric buyer terminal.

Accordingly, the server may filter out a first fabric supplier terminal without the business registration number among the plurality of first fabric supplier terminals, and register a first fabric supplier terminal having a supply amount that can meet the minimum expected purchase amount in the server, based on the transaction history and size of the fabric supplier.

In particular, by weighting fabrics on which the fabric supplier may collaborate with other fabric suppliers, the server may supply the fabric as much as the volume of order of the fabric buyer terminal through collaboration with other fabric supplier terminals even when the volume of order of the fabric buyer terminal is larger than the suppliable amount of one fabric supplier terminal.

In step S302, the server may transmit a grant message to the second fabric supplier terminal having the first screening score greater than or equal to a preset first score among the plurality of first fabric supplier terminals. Here, the grant message may be a message indicating that registration of the fabric supplier terminal in the server is granted. For example, as the number of fabric supplier terminals registered in the server increases, the preset first score may increase.

In step S303, the server may receive information about the fabrics from the second fabric supplier terminal having the first screening score greater than or equal to the preset first score among the plurality of first fabric supplier terminals. Among the plurality of first fabric supplier terminals, a first fabric supplier terminal having the first screening score greater than or equal to the preset first score may be referred to as a second fabric supplier terminal.

Here, the information about the fabrics may include information about a type of the fabric supplied, information about a material of the fabric supplied, information about a color of the fabric supplied, information about a pattern of the fabric supplied, information about a width of the fabric supplied, information about weight of the fabric supplied, information about a price of the fabric supplied, information about a sample image of the fabric supplied, and information about a suppliable amount of the fabric supplied. The information about the type of the fabric supplied may include a value matching the type of the fabric. The information about the material of the fabric supplied may include the type of the material used for the fabric and a mixing ratio. The mixing ratio may be a ratio of components forming the fabric. The information about the color of the fabric supplied is information indicating the color of the fabric, and may include a red green blue (RGB) value. For example, when a plurality of colors is included in the fabric, the information about the color of the fabric supplied may include an RGB value for each color. The information about the pattern of the fabric supplied is information indicating various patterns such as check and stripe, and may include a value matching the pattern. For example, a value matching each pattern may be pre-stored in the server. For example, the information about the pattern of the fabric supplied may include a value matching the pattern. The information about the width of the fabric supplied is information indicating the width of the fabric. The information about the weight of the fabric supplied is information indicating the weight of the fabric, and may indicate the weight for 1 yard. The information about the price of the fabric supplied is information indicating the price of the fabric, and may include a price per weight in reference units. Alternatively, for example, the information about the price of the fabric supplied may indicate a price for 1 yard. For example, the price of a supplied fabric may be based on dollars. The sample image of the fabric supplied is an image of a sample of the fabric and may include sample images of various sizes. The information about the suppliable amount of the fabric supplied is information about the amount of fabric currently available for supply, and may include a range of the total weight of the fabric that may be supplied per day for each fabric. For example, the range of the weight may be replaced by a range of length.

For example, based on the server receiving information about the fabric from the second fabric supplier terminal, the server may determine a product number for identifying the fabric.

According to an embodiment, a first vector may be generated for each second fabric supplier terminal through data preprocessing of the information about the fabric. The first vector may include a value related to the type of the fabric supplied, a value related to the material of the fabric supplied, values related to the color and pattern of the fabric supplied, a value of the width of the fabric supplied, and a value of the weight of the fabric supplied. The value related to the type of the fabric supplied may be a value matching the type of the fabric. The value related to the material of the fabric supplied may be a value obtained by combining a value matching the type of the material with a mixing ratio. For example, when the mixing ratio with the material used for the fabric is 53% cotton and 47% nylon, the value matching the cotton is 1, and the value matching the nylon is 3, the value related to the material of the fabric supplied may be determined as (153, 347). The value related to the color and pattern of the fabric supplied may be a value obtained by combining an RGB value matching the color and a value matching the pattern. For example, when the color of the fabric is red and the pattern is a check pattern, if the RGB value of red is (255, 0, 0) and the value matching the check pattern is 2, the value related to the color and pattern of the fabric supplied may be determined as (255, 0, 2). The value related to the width of the fabric supplied may be a value indicating the width of the fabric, and the value related to the weight of the fabric supplied may be a value indicating the weight per yard of the fabric.

For example, a first reduced vector may be generated for the first vector through a principal component analysis. When the first vector data is projected on the main component axis, the server may determine the axis of the data having the highest variance and reduce the dimension to the determined axis. The server may generate a first axis based on the largest variance among a plurality of first vector data, and generate a second axis as a vector perpendicular to the first vector axis. Thereafter, the server may generate a third axis as a vector perpendicular to the second axis. When the server projects the source data onto the three generated vector axes, the server may dimensionally reduce the original data to as many dimensions as the number of vector axes. In this case, a plurality of first vectors obtained by performing data preprocessing on the information about the fabric may be generated. Vectors obtained by dimensionally reducing the plurality of generated first vectors through various dimensional reduction techniques may be referred to as first reduced vectors.

N similar groups may be determined by applying a Density-Based Spatial Clustering of Applications with Noise (DBSCAN) technique to the plurality of first reduced vectors for all the second supplier terminals. Different recommendation information may be transmitted for each of the n similar groups. For example, the DBSCAN technique is one of various clustering techniques, which may refer to unsupervised learning that groups data with similar attributes into a certain number of clusters. DBSCAN presupposes that if a particular element (point) belongs to a cluster, it must be located close to many other elements in the cluster, and radius and minimum points may be used for this calculation. The radius may be a radius based on a specific data element, and may be referred to as a dense area. The minimum points may indicate how many points are required around the core point to specify the core point. In addition, the points of the dataset may be divided into a core, a border, and an outlier point. For example, the server may check the size of the radius for each point and search for the number of neighbor points. Thereafter, when m or more points are present within the radius range, the server may determine the corresponding point as a core point. Then, the server may determine a point included at the radius from the core point as a border point. In addition, the server may determine a point not included in the range of the radius from the core point as an outlier point. The outlier point may be excluded from the corresponding cluster. In addition, when the distance between the core points is less than the radius, the server may classify the points into the same cluster.

The recommended information may include information about the trend of yarn prices, information about yarn companies, information about weaving companies, information about dyeing companies, and information about packaging companies. For example, the recommendation information may be pre-stored in the server. The information about the trend of the yarn price is information about the change in price of a yarn used for the fabric supplied by the corresponding similar group, and may include the average price of the yarn obtained at a specific cycle over a preset period of time. The information about the yarn companies is information about the company that produces the yarn, and may be information about the companies that produce the yarn used for the fabric supplied by the similar group. For example, the yarn used for the fabric may be a yarn set according to the type of the fabric. The information about the weaving companies is information about the companies that produce raw fabric through the weaving process, and may be information about the companies that produce raw fabric used for the fabric supplied by the similar group. The information about the dyeing companies is information about the companies performing the dyeing process, and may be information about the companies that provide dyeing processing used for the fabric supplied by the similar group. The information about the packaging companies is information about the companies that pack the fabric, and may be information about the companies that provide the packaging necessary to export the fabric supplied by the similar group.

In step S304, the server may receive information about a fabric buyer from each of the plurality of first fabric buyer terminals.

The information about the fabric buyer may include information about a data universal numbering system (DUNS) number, contact information about the fabric buyer, location information about the fabric buyer, information about types of fabric purchased by the fabric buyer, information related to total assets of the fabric buyer, and information about a transaction history of the fabric buyer. The DUNS number is a nine-digit unique number used internationally to identify businesses based on regions. The location information about the fabric buyer may be information about an address for the fabric buyer to receive the fabric. For example, the information about the address for the fabric buyer to receive the fabric may include information about the country or region and the longitude and latitude of the address. A value matching the country or region may be preset in the server. The information about types of fabric purchased by the fabric buyer is information indicating the types of fabrics previously purchased by the fabric buyer, and the types of fabrics may be distinguished according to values matching the types of fabric. For example, the information about the types of fabric purchased by the fabric buyer may include at least one value matching the types of fabric. The information related to the total assets of the fabric buyer is information about the current total assets of the fabric buyer, and may be information to assess whether the fabric buyer has money to buy the fabric. The information about the transaction history of the fabric buyer may include information about the total number of transactions of the fabric buyer and the purchase amount of the fabric buyer.

For example, the server may determine a second screening score for each of the plurality of first fabric buyer terminals based on the information about the fabric buyer.

For example, the second screening score may be determined according to presence or absence of the DUNS number of the fabric buyer, an average amount of purchase of the fabric buyer for a preset period, the number of transactions of the fabric buyer, the total assets of the fabric buyer, an amount of each of the fabrics purchased by the fabric buyer, and a country or region of the fabric buyer.

Additionally, for example, the second screening score may be determined by Equation 2 below.

$$S_2 = \frac{d}{l} * \left(1 + \frac{n_t + p_s + 8*n_t*p_s}{(4*n_t+1)*(4*p_s+1)}\right) * \sum_{j=1}^{l} \frac{100*\gamma_j*b_j}{fm_j} \quad \text{[Equation 2]}$$

In Equation 2, $S_2$ may be the second screening score, a may be the weight related to the DUNS number, $n_t$ may be the total number of transactions of the fabric buyer, $m_s$ is the average purchase amount of the fabric buyer for a preset period, and l may be the number of fabrics purchased by the fabric buyer. Also, $b_j$ may be the amount of purchase of the j-th fabric, the $fm_j$ may be a minimum expected amount of purchase of the j-th fabric, and $\gamma_j$ may be a weight related to the country or region where the j-th fabric is received.

The weight related to the DUNS number may be 0 or 1. For example, when the DUNS number is not present, the weight may be determined to be 0. When the DUNS number is present, the weight may be determined to be 1. The weight related to the country or region where the j-th fabric is received may be determined to be 1 to 2. For example, as the distance between the country or region where the fabric is received and a factory producing the fabric is far and it is difficult to export the fabric to the country or region, the weight may be determined to a value closer to 2. For example, the amount of purchase of the j-th fabric may be the total weight of the fabric purchased by the fabric buyer. For example, the minimum expected amount of purchase of the j-th fabric may be a value preset in the server. The minimum expected amount of purchase is the minimum expected amount of purchase that the buyer desires. The minimum expected amount of purchase matched with each type of fabric may be preset in the server. For example, the minimum expected amount of purchase matched with each type of fabric may be determined by the server based on the information about the transaction history of the fabric buyer terminal.

Accordingly, the server may filter out a first fabric buyer terminal without the DUNS number among the plurality of first fabric buyer terminals, and register a first fabric buyer terminal with purchasing power for the fabric by reflecting the transaction history and location of the fabric buyer.

In step S305, the server may transmit a grant message to a second fabric buyer terminal having the second screening score greater than or equal to the preset second score among the plurality of first fabric buyer terminals.

Here, the grant message may be a message indicating that registration of the fabric buyer terminal in the server is granted. For example, as the number of fabric buyer terminals registered in the server increases, the preset second score may increase.

In step S306, the server may receive estimate information about the fabric from the second fabric buyer terminal having the second screening score greater than or equal to the preset second score among the plurality of first fabric buyer terminals. Among the plurality of first fabric buyer terminals, a first fabric buyer terminal having the second screening score greater than or equal to the preset second score may be referred to as a second fabric buyer terminal.

Here, the estimate information may include information about a type of the purchased fabric, information about a material of the purchased fabric, information about a color of the purchased fabric, information about a pattern of the purchased fabric, information about a width of the purchased fabric, and information about weight of the purchased fabric, information about a delivery date of the purchased fabric, and information about the volume of order of the purchased fabric.

The information about the type of the purchased fabric may include at least one value matching the type of the fabric. The information about the color of the purchased fabric is information indicating the color of the fabric, and may include at least one RGB value. For example, when a plurality of colors is included in the fabric, the information about the color of the purchased fabric may include an RGB value for each color. The information about the pattern of the purchased fabric is information indicating various patterns such as check and stripe, and may include at least one value matching the pattern. The information about the width of the purchased fabric is information indicating the width of the fabric. The information about the weight of the purchased fabric is information indicating the weight of the fabric, and may indicate the weight for 1 yard. The information about the delivery date of the purchased fabric is information indicating the date on which the fabric buyer wants to receive the fabric, and may include the delivery date for each fabric. The information about the volume of order of the purchased fabric is information about the amount of fabric desired by the fabric buyer, and may include the total weight desired for each fabric. For example, a range of the weight may be replaced by a range of length.

In step S307, the server may determine a plurality of supplier groups matching the second fabric buyer terminal through a matching model using a plurality of neural networks based on the estimate information, the information about the fabric supplier of the second fabric supplier terminal, and the information about the fabrics of the second fabric supplier terminal.

Each of the plurality of supplier groups may include one or more third fabric supplier terminals capable of supplying more than a volume of order of at least one purchased fabric included in the estimate information.

For example, a first base vector may be generated for each purchased fabric through data preprocessing based on the estimate information. The first base vector may include a value related to a type of the purchased fabric, a value related to a material of the purchased fabric, a value related to a color of the purchased fabric, a value related to a pattern of the purchased fabric, a value related to a width of the purchased fabric, a value of weight of the purchased fabric, a value for the volume of order of the purchased fabric. That is, when the purchased fabric of the buyer includes three types of fabric, i.e., cotton, linen, and nylon, the first base vector may be generated for cotton, linen, and nylon. A first reference vector may be generated for each second fabric supplier terminal through preprocessing based on the information about the fabrics. The first reference vector may include the value related to the type of the fabrics supplied, the value related to the material of the fabrics supplied, the value related to the color of the fabrics supplied, the value related to the pattern of the fabrics supplied, the value of the width of the fabrics supplied, and the value of the weight of the fabrics supplied. Based on the first base vector and the first reference vector being input to the first neural network, a plurality of third fabric supplier terminals capable of supplying the purchased fabric included in the estimate information may be determined.

In addition, for example, through data preprocessing based on the estimate information, a second base vector including a value for the volume of order of each purchased fabric and a value matched to the country or region of the fabric buyer may be generated. Through data preprocessing based on information about fabric suppliers of the plurality of third fabric supplier terminals, an input vector may be generated for each purchased fabric. The input vector may include identification values for the plurality of third fabric supplier terminals, values matched to countries or regions for the plurality of third fabric supplier terminals, average sales of the plurality of third fabric suppliers for a preset period, the number of transactions of the plurality of third fabric suppliers, an available amount of supply of the plurality of third fabric suppliers, and a value related to collaboration of the plurality of third fabric suppliers. Based on the input vectors and the second base vectors being input to the second neural network, a plurality of supplier groups matching the second fabric buyer terminal may be determined.

In other words, the server may determine second fabric supplier terminals matching the estimate information as the plurality of third fabric supplier terminals through the first neural network based on the first base vector and the first reference vector, and may determine a plurality of supplier groups capable of supplying more than the volume of order of the purchased fabric included in the estimate information among the plurality of third fabric supplier terminals through the second neural network based on the second base vector and the input vector.

In step S308, the server may transmit information about the plurality of supplier groups to the second fabric buyer terminal.

Here, the information about the plurality of supplier groups may include information about the price of the fabric for each supplier group, information about the expected days for each supplier group, and information about the sample image for each supplier group. For example, the server may determine the information about the price of the fabric for each supplier group, information about the expected delivery date for each supplier group, and information about the sample image for each supplier group based on the information about the fabric sent from each supplier group. The price of the fabric may include the price of each purchased fabric. The expected days may be an expected period for the fabric buyer to receive the fabric corresponding to the volume of order. For example, the expected days may be determined according to the volume of order, the location information about the fabric supplier in the supplier group, and the location information about the fabric buyer. In other words, the expected days may increase as the volume of order increases, the distance of the fabric supplier determined by the location information about the fabric supplier decreases, and the distance between the fabric buyer and the production factory of the fabric supplier determined by the location information about the fabric supplier increases.

In step S309, the server may receive, from the second fabric buyer terminal, information indicating a first supplier group, which is one of the plurality of supplier groups.

The information indicating the first supplier group may include a business registration number of the third fabric buyer terminal included in the first supplier group.

In step S310, the server may transmit an order message containing information about the fabric buyer of the second fabric buyer terminal and estimate information about the fabric of the second fabric buyer terminal to the first supplier group. Here, the order message may be a message informing the first supplier group that the fabric buyer intends to purchase the fabric.

In step S311, based on the order message being transmitted, the server may initiate a fabric export session for the second fabric buyer terminal and the first supplier group.

For example, the fabric export session may include various steps for exporting the fabric.

Based on the commencement of the fabric export session, the server may transmit, to the second fabric buyer terminal and the first supplier group, information about a contract prepared according to the information about the fabric buyer, the information about the fabric supplier, and the estimate information. The information about the contract may include export contracts prepared according to basic forms, including contracting party, contract applied area, fabric type, fabric quantity, fabric quality, fabric packaging, price, payment method, delivery method, confidentiality, liability for breach of contract, governing law, contract cancellation, and contract language. In this case, the information about the contract may include a contract prepared in a language used in the country of the second fabric buyer terminal and a contract prepared in Korean.

The server may transmit a document related to telegraphic transfer according to the information about the contract to the second fabric buyer terminal and the first supplier group. Here, the telegraphic transfer is a method of payment by issuing a payment order in the form of telegraphic transfer by which the remittance bank entrusts the payment bank with the payment of a certain amount at the request of the buyer terminal. The document related to telegraphic transfer may include a document that should be prepared for telegraphic transfer and a document indicating that telegraphic transfer has been completed.

The server may transmit information about a work instruction received from the second fabric buyer to the first supplier group. The information about the work instruction may be information about the details of the instruction of the fabric buyer on the production and supply of the fabric. For example, the information about the work instruction may include information indicating the packaging state of the fabric in supplying the fabric. When the fabric is produced to meet the volume of order of the fabric buyer, the information about the work instruction may include information about the production quality of the fabric.

The server may transmit the work information received from the first supplier group to the second fabric buyer terminal. The work information is information indicating that the work on the fabric has been completed according to the information about the work instruction, and may include an image captured to indicate the packaging state of the fabric and an image captured to indicate the quality of the fabric.

The server may transmit an inspection result for the fabric received from the first supplier group to the second fabric buyer terminal. The inspection result for the fabric may be an inspection certificate obtained by making a request to a separate inspection company for an inspection of the fabric.

The server may transmit information about a transport schedule of the fabrics produced by the first supplier group and information about a shipping document to the second fabric buyer terminal.

The information about a transport schedule of the fabrics may include at least one of an estimated time of completion, an estimated time of readiness, an estimated time of departure, an estimated time of sailing, an estimated time of berthing, an estimated time of arrival, or an estimated time of warehouse. The information about the shipping document may include at least one of a shipping invoice, a proforma invoice, a customs invoice, a consular invoice, an insurance policy, an insurance certificate, an insurance cover note, a shipped bill of lading, a received bill of lading, a custody bill of lading, a packing statement, a measurement certificate, or a certificate of origin.

The server may transmit information about a document related to a final payment according to the information about the contract to the first supplier group. The information about the document related to the final payment may be a document on the details of fulfilled payment according to the final payment.

The server may transmit a document related to delivery completion by courier to the first supplier group and the second fabric buyer terminal. For example, the first supplier group may use a courier service to deliver a fabric sample or a document related to an export of the fabric to the second fabric buyer terminal. In this case, the server may transmit, to the first supplier group and the second fabric buyer terminal, a document indicating that the delivery of the fabric sample or the delivery of the document related to the export of the fabric through the courier service has been completed.

The server may receive information about feedback from each of the first supplier group and the second fabric buyer terminal. The information about the feedback received from the first supplier group may include transaction satisfaction with the transaction and whether the payment of the fabric buyer is overdue. The information about the feedback received from the second fabric buyer terminal may include transaction satisfaction with the transaction, whether the fabric supplier complies with the delivery date, and the fabric defect rate.

Additionally, for example, after a fabric export session is initiated, the server may determine a representative terminal among the one or more third fabric supplier terminals included in the first supplier group and transmit information related to the fabric export session to the representative terminal. For example, when a plurality of third fabric supplier terminals is included in the first supplier group, a third supplier terminal having the largest amount of supply of the fabric may be determined as the representative terminal. For example, when the amount of supply of the fabric is the same, the server may send a message to the second fabric buyer terminal to request that the second fabric buyer terminal select the representative terminal, and may determine a third supplier terminal selected by the second fabric buyer terminal as the representative terminal.

Accordingly, the server may reduce the volume of data allocated to the message transmitted to the first supplier group and increase the processing speed for tasks related to the fabric export session.

In step S312, based on receiving a completion message indicating that fabric export is completed from the second fabric buyer terminal, the server may terminate the fabric export session.

Figure 4:
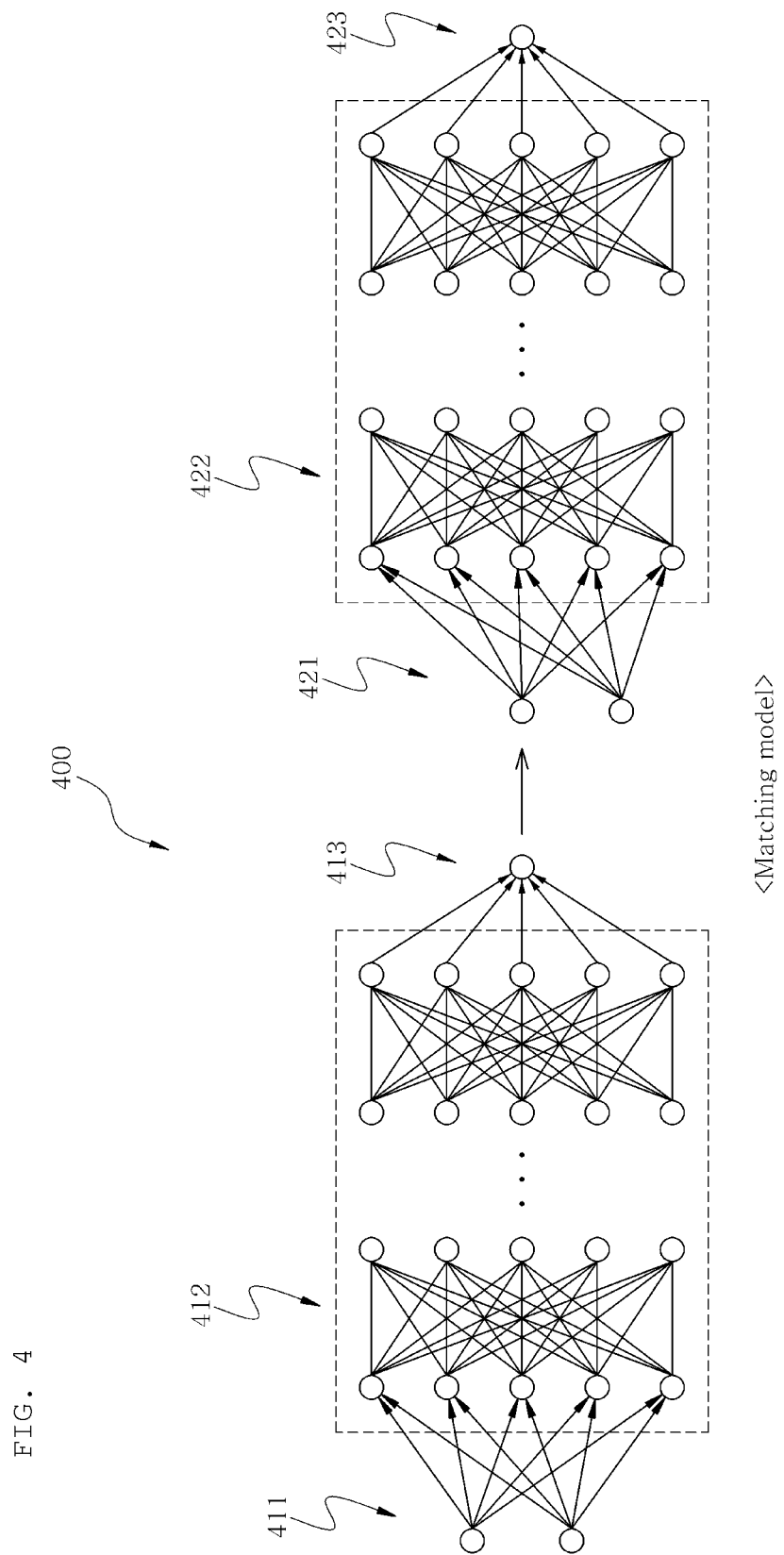
FIG. 4 is a diagram illustrating a matching model according to an embodiment.

FIG. 4 is a diagram illustrating a matching model according to an embodiment. The embodiment of FIG. 4 may be combined with various embodiments of the present disclosure.

Referring to FIG. 4, the matching model 400 may include a first neural network and a second neural network. The first neural network may include a first input layer 411, one or more first hidden layers 412, and a first output layer 413. The second neural network may include a second input layer 421, one or more second hidden layers 422, and a second output layer 423.

For example, through data preprocessing based on the estimate information, the server may generate a first base vector for each purchase fabric, including a value related to a type of the purchased fabric, a value related to a material of the purchased fabric, a value related to a color of the purchased fabric, a value related to a pattern of the purchased fabric, a value related to a width of the purchased fabric, a value of weight of the purchased fabric, and a value for the volume of the order of the purchased fabric.

The value related to the type of the purchased fabric may be a value matching the type of the fabric. The value related to the material of the purchased fabric may be a value obtained by combining a value matching the type of the material with a mixing ratio. For example, when the mixing ratio with the material used for the fabric is 53% cotton and 47% nylon, the value matching the cotton is 1, and the value matching the nylon is 3, the value related to the material of the purchased fabric may be determined as (153, 347). The value related to the color of the purchased fabric may be an RGB value (e.g., (255, 0, 0) in the case of red). The value related to the pattern of the purchased fabric may be a value matching the pattern (e.g., 2 in the case of a check pattern).

Through data preprocessing based on the information about the fabrics, the server may generate a first reference vector for each second fabric supplier terminal, including the value related to the type of the fabrics supplied, the value related to the material of the fabrics supplied, the value related to the color of the fabrics supplied, the value related to the pattern of the fabrics supplied, the value of the width of the fabrics supplied, and the value of the weight of the fabrics supplied.

The server may not input, to the first neural network, the first reference vector of the second fabric supplier terminal, for which the value related to the type of the purchased fabric is different from the value related to the type of the fabric supplied. That is, the server may input, to the first neural network, the first reference vector of the second fabric supplier terminal for which the value related to the type of the purchased fabric is equal to the value related to the type of the fabric supplied.

The server may determine the similarity of each of the second fabric supplier terminals by inputting the first base vector generated for each purchased fabric and the first reference vector generated for each second fabric supplier terminal into the first neural network. The server may determine second fabric supplier terminals whose similarity is greater than or equal to a preset similarity as the plurality of third fabric supplier terminals capable of supplying the purchased fabric included in the estimate information.

For example, each of learning data including a plurality of first base vectors, a plurality of first reference vectors, and a plurality of answer similarities may be input to the first input layer of the first neural network and output as a first output vector through the one or more first hidden layers and the first output layer. The first output vector may be input to a first loss function layer connected to the first output layer, the first loss function layer output a first loss value using a first loss function to configured to compare the first output vector and a first answer vector for each of the learning data, and a parameter of the first neural network may be trained to reduce the first loss value.

The answer similarity is a similarity between the first base vector and the first reference vector, and the similarity may be a value obtained by averaging two or more of similarity based on the Euclidean distance, cosine similarity, or Pearson similarity. For example, the answer similarity may be a value obtained by averaging the similarity based on the Euclidean distance to the first base vector and the first reference vector and the cosine similarity to the first base vector and the first reference vector. The first base vector, the first reference vector, and the answer similarity may be included in one set, and a plurality of sets may be pre-stored in the server. For example, the preset similarity may be set to a larger value as the number of fabric supplier terminals registered in the server increases.

For example, the server may generate a second base vector including a value for the volume of order for each purchased fabric and a value matching the country or region of the fabric buyer through data preprocessing based on the estimate information. For example, when the volume of order for each purchased fabric is 2500 kg of cotton, 3000 kg of linen and 1000 kg of silk, and the country or region is France, the second base vector may be (2500, 3000, 1000, 250).

Through data preprocessing based on information about fabric suppliers of the plurality of third fabric supplier terminals, the server may generate an input vector for each purchased fabric, including identification values for the plurality of third fabric supplier terminals, values matched to countries or regions for the plurality of third fabric supplier terminals, average sales of the plurality of third fabric suppliers for a preset period, the number of transactions of the plurality of third fabric suppliers, an available amount of supply of the plurality of third fabric suppliers, and a value related to collaboration of the plurality of third fabric suppliers. The value related to collaboration may be a value of the number of fabrics on which collaboration may be performed.

Based on the input vectors generated for the purchased fabrics and the second base vectors being input to the second neural network, a plurality of supplier groups matching the second fabric buyer terminal may be determined.

Each of learning data including the plurality of input vectors, the plurality of second base vectors, and a vector for an answer plurality of supplier groups may be input to the second input layer of the second neural network, and output as a second output vector through the one or more second hidden layers and the second output layer. The second output vector may be input to a second loss function layer connected to the second output layer. The second loss function layer may output a second loss value using a second loss function configured to compare the second output vector and a second answer vector for each of the learning data, and a parameter of the second neural network is trained to reduce the second loss value.

The vectors for the answer plurality of supplier groups may include an input vector set as the answer for each second base vector. That is, the parameter of the second neural network may be trained to determine one or more third fabric supplier terminals satisfying the volume of order of the second base vector as a supplier group.

Accordingly, the server may determine second fabric supplier terminals matching the estimate information as the plurality of third fabric supplier terminals through the first neural network based on the first base vector and the first reference vector, and may determine a plurality of supplier groups capable of supplying more than the volume of order of the purchased fabric included in the estimate information among the plurality of third fabric supplier terminals through the second neural network based on the second base vector and the input vector.

Accordingly, the server may efficiently recommend a plurality of supplier groups to the fabric buyer terminal by reflecting not only the estimate information but also various information about the country or region of the fabric buyer and the fabric supplier.

Figure 5:
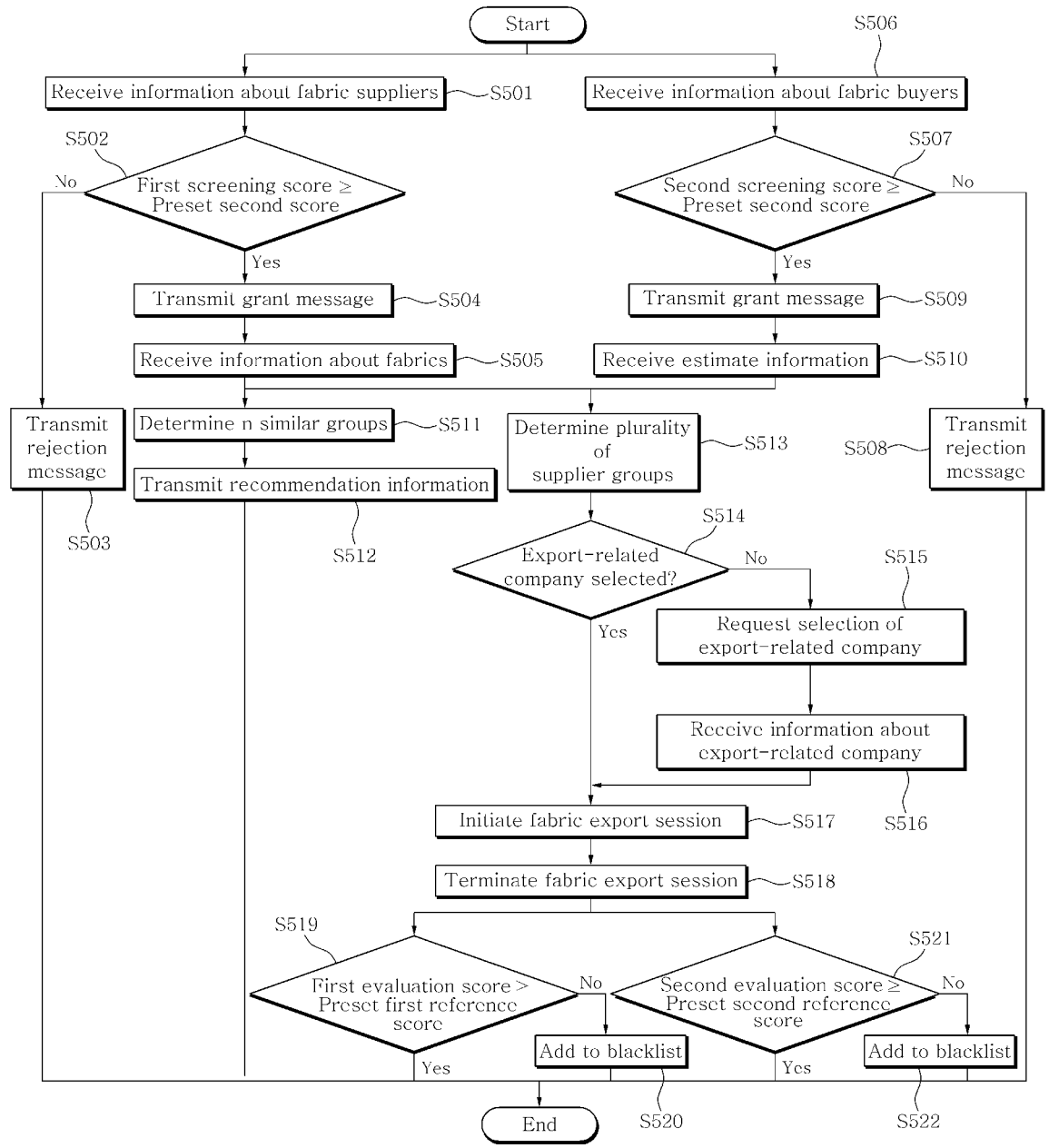
FIG. 5 is a flowchart illustrating a method of managing fabric supplier terminals and fabric buyer terminals by a server using a plurality of neural networks according to an embodiment.

FIG. 5 is a flowchart illustrating a method of managing fabric supplier terminals and fabric buyer terminals by a server using a plurality of neural networks according to an embodiment. The embodiment of FIG. 5 may be combined with various embodiments of the present disclosure.

Referring to FIG. 5, in step S501, the server may receive information about the fabric supplier from each of a plurality of first fabric supplier terminals.

In step S502, the server may determine whether a first screening score is greater than or equal to a preset first score for each of the plurality of first fabric supplier terminals. For example, the first screening score may be determined by Equation 1 described above.

In step S503, when the first screening score is less than the preset first score, the server may transmit a rejection message to the first fabric supplier terminal for which the first screening score is less than the preset first score. Here, the rejection message is a message that refuses to register the fabric supplier terminal in the server. For example, the rejection message may include the first screening score.

In step S504, when the first screening score is greater than or equal to the preset first score, the server may transmit a grant message to the first fabric supplier terminal for which the first screening score is greater than or equal to the preset first score. Here, the grant message may be a message indicating that registration of the fabric supplier terminal in the server is granted.

In step S505, the server may receive information about the fabric from the second fabric supplier terminal for which the first screening score is greater than or equal to the preset first score among the plurality of first fabric supplier terminals.

In step S506, the server may receive information about the fabric buyer from each of the first fabric buyer terminals.

In step S507, the server may determine whether the second screening score is greater than or equal to a preset second score for each of the plurality of first fabric buyer terminals. For example, the second screening score may be determined by Equation 2 described above.

In step S508, when the second screening score is less than the preset second score, the server may transmit a rejection message to the fabric buyer terminal for which the second screening score is less than the preset second score. Here, the rejection message is a message that refuses to register the fabric buyer terminal in the server. For example, the rejection message may include the second screening score.

In step S509, when the second screening score is greater than or equal to the preset second score, the server may transmit a grant message to the fabric buyer terminal having the second screening score greater than or equal to the preset second score. Here, the grant message may be a message indicating that registration of the fabric buyer terminal in the server is granted.

In step S510, the server may receive estimate information from the second fabric buyer terminal having the second screening score greater than or equal to the preset second score among the plurality of first fabric buyer terminals.

In step S511, the server may determine n similar groups for all the second supplier terminals through a Density-Based Spatial Clustering of Applications with Noise (DB-SCAN) technique.

For example, the server may generate the first vector for each second fabric supplier terminal through data preprocessing of the information about the fabric, and generate a first reduced vector by dimensionally reducing the generated first vector through various dimensional reduction techniques. The server may determine n similar groups by applying the DBSCAN technique to a plurality of first reduced vectors.

Additionally, for example, the radius of the DBSCAN technique may increase in proportion to the number of fabric supplier terminals registered in the server. The minimum points of the DBSCAN technique may increase in proportion to the number of types of fabrics preset in the server.

In step S512, the server may transmit different recommendation information to each of the n similar groups.

In step S513, the server may determine a plurality of supplier groups matching the second fabric buyer terminal through a matching model using a plurality of neural networks based on the estimate information, the information about the fabric supplier of the second fabric supplier terminal, and the information about the fabrics of the second fabric supplier terminal.

For example, the server may transmit information about the plurality of supplier groups to the second fabric buyer terminal. The second fabric buyer terminal may select any one supplier group from among the plurality of supplier groups as the first supplier group and transmit information indicating the first supplier group to the server.

For example, the server may transmit an order message to the first supplier group.

In step S514, the server may determine whether the first supplier group and the second fabric buyer terminal have selected an export-related company.

For example, the server may transmit a message checking whether an export-related company has been selected to the first supplier group and the second fabric buyer terminal. Based on a selected message being received from the first supplier group and the second fabric buyer terminal, the server may determine that the export-related company has been selected. Based on an unselected message being received from the first supplier group and the second fabric buyer terminal, the server may determine that the export-related company has not been selected. The selected message may include information about export-related companies. The unselected message may include a value indicating that the export-related company has not been selected.

For example, based on the transmission of the order message, the server may transmit a message checking whether an export-related company has been selected to the first supplier group and the second fabric buyer terminal.

In step S515, when an export-related company has not been selected, the server may request that an export-related company be selected.

For example, the server may transmit a selection request message requesting selection of an export-related company to the first supplier group and the second fabric buyer terminal. The selection request message may include information about a carrier, information about a courier, information about a customs agent, and information about a domestic carrier. For example, the information about the carrier is information about the company that transports the fabric, and may include information about the shipping company or the airline company. The information about the courier is information about companies that deliver fabric samples or documents related to fabric exports. The information about the customs agent is information about the customs agent to prepare an export exemption. The information about the domestic carrier is information about companies for transporting fabrics in Korea.

In step S516, the server may receive information about export-related company from the first supplier group and the second fabric buyer terminal. For example, the information about the export-related company may include the name of the export-related company and contact information about the export-related company.

In step S517, the server may initiate a fabric export session based on receiving information about an export-related company.

In step S518, based on receiving a completion message indicating that the fabric export is completed from the second fabric buyer terminal, the server may terminate the fabric export session.

In step S519, after the fabric export session is terminated, the server may determine whether the first evaluation score for the third fabric supplier terminal included in the first supplier group is greater than or equal to a preset first reference score.

For example, whenever the number of transactions by the fabric supplier terminal reaches a preset number of transactions, the server may determine the first evaluation score based on information about feedback received from the second fabric buyer terminal.

Additionally, for example, the first evaluation score may be determined by Equation 3 below.

$$Ev_1 = (1 - er) * \frac{1}{(1 + n_p) * p} * \sum_{x=1}^{p} fp1_x \qquad \text{[Equation 3]}$$

In Equation 3, Ev1 may be the first evaluation score, er may be an average of a defect rate of the corresponding fabric supplier terminal, p may be the number of transactions of the corresponding fabric supplier terminal through the server, $fp1_x$ may be the transaction satisfaction with the x-th transaction, and $n_p$ may be the number of times the fabric supplier terminal have failed to meet the delivery date.

For example, whenever the preset number of transactions is reached, the number of times the fabric supplier terminal have failed to meet the delivery date may be initialized to a default value.

In step S520, when a first evaluation score is less than a preset first reference score, the server may add a third fabric supplier terminal for which the first evaluation score is less than the preset first reference score to the blacklist.

For example, the fabric supplier terminal added to the blacklist may be blocked from accessing the server for a period proportional to a value obtained by subtracting the first evaluation score from the preset first reference score.

In step S521, after the fabric export session is terminated, the server may determine whether a second evaluation score for the second fabric buyer terminal is greater than or equal to a preset second reference score.

For example, whenever the number of transactions by the fabric buyer terminal reaches a preset number of transactions, the server may determine the second evaluation score based on the information about feedback received from the first supplier group. In this case, the information about the feedback may be transmitted by the representative terminal among the third fabric supplier terminals included in the first supplier group.

Additionally, for example, the second evaluation score may be determined by Equation 4 below.

$$Ev_2 = \frac{1}{(1+d_p)*q} * \sum_{y=1}^{q} fp2_y \qquad \text{[Equation 4]}$$

In Equation 4, Ev2 may be the second evaluation score, q may be the number of transactions of the corresponding fabric buyer terminal through the server, $fp2_y$ may be the number of transaction satisfaction with the y-th transaction, and $d_p$ may be the number of overdue payments of the fabric buyer terminal.

For example, whenever the preset number of transactions is reached, the number of overdue payments of the fabric buyer terminal may be initialized to a default value.

In step S522, when the second evaluation score is less than the preset second reference score, the server may add the second fabric buyer terminal whose second evaluation score is less than the preset second reference score to the blacklist.

For example, the fabric buyer terminal added to the blacklist may be blocked from accessing the server for a period proportional to a value obtained by subtracting the second evaluation score from the preset second reference score.

Figure 6:
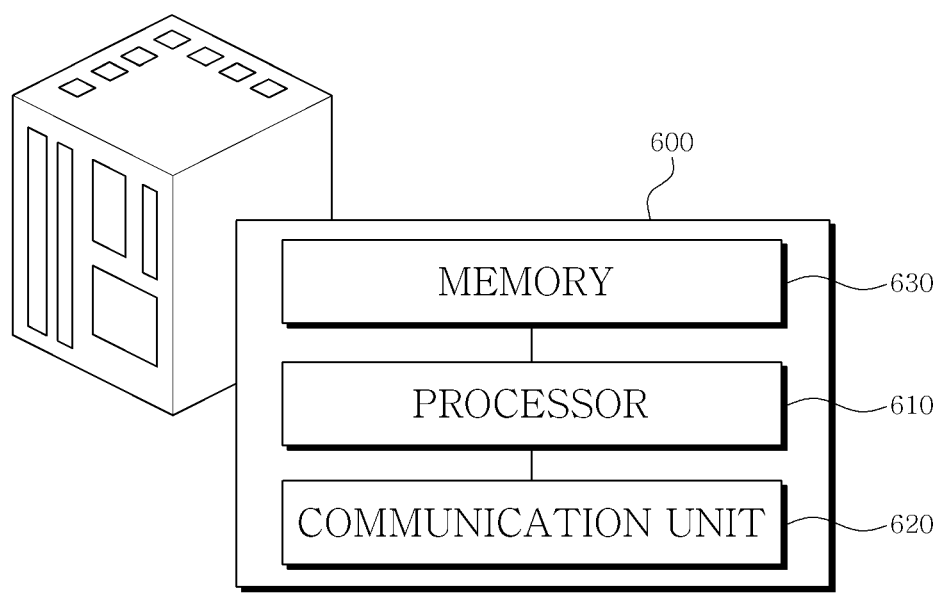
FIG. 6 is a block diagram illustrating a configuration of a server according to an embodiment.

FIG. 6 is a block diagram illustrating a configuration of a server according to an embodiment. The embodiment of FIG. 6 may be combined with various embodiments of the present disclosure.

As shown in FIG. 6, the server 600 may include a processor 610, a communication unit 620, and a memory 630. However, not all of the components illustrated in FIG. 6 are essential components of the server 600. The server 600 may be implemented by more components than the components shown in FIG. 6. Alternatively, the server 600 may be implemented by fewer components than the components shown in FIG. 6. For example, according to some embodiments, the server 600 may further include a user input interface (not shown) and an output unit (not shown) in addition to the processor 610, the communication unit 620, and the memory 630.

The processor 610 typically controls the overall operation of server 600. The processor 610 may include one or more processors to control other components included in the server 600. For example, the processor 610 may generally control the communication unit 620 and the memory 630 by executing programs stored in the memory 630. In addition, the processor 610 may perform the functions of the server 600 described in FIGS. 3 to 5 by executing programs stored in the memory 630.

The communication unit 620 may include one or more components that cause the server 600 to communicate with another device (not shown) and server (not shown). The other device (not shown) may be a computing device such as the server 600 or a sensing device, but is not limited thereto. The communication unit 620 may receive user input from another electronic device over a network or may receive data stored in an external device from the external device.

For example, the communication unit 620 may transmit and receive a message for establishing a connection with at least one device. The communication unit 620 may transmit information generated by the processor 610 to at least one device connected to the server. The communication unit 620 may receive information from at least one device connected to the server. In response to information received from at least one device, the communication unit 620 may transmit information related to the received information.

The memory 630 may store a program for processing and controlling the processor 610. For example, the memory 630 may store information input to the server or information received from another device over a network. In addition, the memory 630 may store data generated by the processor 610. The memory 630 may store information input to the server 600 or output from the server 600.

The memory 630 may include a storage medium of at least one type among a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a magnetic memory, a magnetic disk, and an optical disk.

The embodiments described above may be implemented by hardware components, software components, and/or a combination of hardware components and software components. For example, the apparatus, method, and components described in the embodiments may be implemented using one or more general purpose or special purpose computers such as, for example, a processor, a controller, an arithmetic logic unit (ALU), a digital signal processor, a microcomputer, a field programmable gate array (FPGA), a programmable logic unit (PLU), microprocessors, or any other device capable of executing and responding to instructions. A processing unit may run an operating system (OS) and one or more software applications executed on the OS. The processing unit may also access, store, manipulate, process, and generate data in response to execution of software. While it is described for convenience of understanding that one processing unit is used, those skilled in the art will understand that the processing unit may include a plurality of processing elements and/or a plurality of types of processing elements. For example, the processing unit may include a plurality of processors or one processor and a controller. Other processing configurations such as parallel processors are also possible.

Software may include a computer program, code, instructions, or a combination of one or more of the foregoing, and may configure a processing unit to operate as desired or independently or collectively instruct the processing unit. Software and/or data may be permanently or temporarily embodied in any type of machine, component, physical device, virtual equipment, computer storage medium or device, or a transmitted signal wave in order to be interpreted by or provide instructions or data to a processing unit. Software may be distributed on networked computer systems and may be stored or executed in a distributed manner. The software and data may be stored on one or more computer-readable media.

The method according to the embodiment may be implemented in the form of program instructions that may be executed through various computer means and recorded on a computer-readable medium. The computer-readable medium may include program instructions, data files, and data structures alone or in combination. The program instructions recorded on the medium may be specially designed and configured for the embodiments or may be known and available to those skilled in computer software. Examples of the computer-readable recording media include magnetic media such as hard disks, floppy disks and magnetic tapes, optical media such as CD-ROMs and DVDs, magnetio-optical media such as floptical disks, and hardware devices specially configured to store and execute program instructions, such as ROM, RAM, and flash memory. Examples of program instructions include highlevel language codes that may be executed by a computer using an interpreter, as well as machine language codes such as those produced by a compiler. The hardware devices described above may be configured to operate as one or more software modules to perform the operations of the embodiments, and vice versa.

As is apparent from the above description, the present disclosure provides the following effects.

According to embodiments, the server may filter a fabric supplier terminal that does not have a business registration number among a plurality of fabric supplier terminals, and may register a fabric supplier terminal with a supply amount that satisfies the minimum expected purchase amount by reflecting the transaction history and scale of the fabric supplier.

According to embodiments, the server may determine a plurality of suppliers that match a fabric buyer terminal through a matching model using multiple neural networks based on estimate information, information about fabric suppliers, and information about fabrics. Thus, the server may use more effectively determine supplier groups that match the fabric buyer terminal by using an artificial intelligence model trained in consideration of different variables for the registered fabric buyer terminals and the fabric supplier terminals.

According to embodiments, the server may group and match the fabric suppliers who may supply the fabric in consideration of the state or region, even if the order volume of the fabric to be purchased by the fabric buyer terminal is large.

Effects that can be obtained in the embodiments of the present disclosure are not limited to the effects mentioned above, and other effects not mentioned will be clearly derived and understood by those of ordinary skill in the art from the following detailed description.

As disclosed above, the embodiments have been described by limited drawings. However, those skilled in the art may apply various technical modifications and variations based on the above. For example, the described techniques may be carried out in an order different from the method described, and/or components of the described system, structure, apparatus, circuit, and the like may be coupled or combined in a different form than the method described, or replaced or substituted by other components or equivalents that may achieve appropriate results.

Therefore, other implementations, other embodiments, and equivalents of the claims are within the scope of the accompanying claims.

What is claimed is:

1. A method for managing fabric supplier terminals and fabric buyer terminals by a server using a plurality of neural networks, the method comprising:
   receiving information about a fabric supplier from each of a plurality of first fabric supplier terminals;
   determining a first screening score for each of the plurality of first fabric supplier terminals based on the information about the fabric supplier;
   receiving information about fabrics from at least one second fabric supplier terminal having the first screening score greater than or equal to a preset first score among the plurality of first fabric supplier terminals;
   receiving information about a fabric buyer from each of a plurality of first fabric buyer terminals;
   determining a second screening score for each of the plurality of first fabric buyer terminals based on the information about the fabric buyers;
   receiving estimate information about a fabric from a second fabric buyer terminal having the second screening score greater than or equal to a preset second score among the plurality of first fabric buyer terminals;
   determining a plurality of supplier groups matching the second fabric buyer terminal through a matching model using a plurality of neural networks based on the estimate information, the information about the fabric supplier of the second fabric supplier terminal, and the information about the fabrics of the second fabric supplier terminal, each of the plurality of supplier groups including one or more third fabric supplier terminals capable of supplying more than a volume of order of at least one purchased fabric included in the estimate information,
   transmitting information about the plurality of supplier groups to the second fabric buyer terminal;
   receiving, from the second fabric buyer terminal, information indicating a first supplier group, the first supplier group being one of the plurality of supplier groups;
   transmitting an order message containing the estimate information about the fabric to the first supplier group;
   based on the order message being transmitted, initiating a fabric export session for the second fabric buyer terminal and the first supplier group;
   based on receiving a completion message indicating that fabric export is completed from the second fabric buyer terminal, terminating the fabric export session.

2. The method of claim 1, wherein the information about the fabric supplier includes information about a business registration number, location information about the fabric supplier, information about types of fabrics handled by the fabric supplier, information related to production equipment of the fabric supplier, information about a suppliable amount of each of the fabrics, and information about a transaction history of the fabric supplier, and information about types of the fabrics suppliable by the fabric supplier through collaboration with another fabric supplier,
   wherein the information about the fabric buyer includes information about a data universal numbering system (DUNS) number, location information about the fabric buyer, information about types of fabrics purchased by the fabric buyer, information related to total assets of the fabric buyer, and information about a transaction history of the fabric buyer;
   wherein the first screening score is determined according to presence or absence of the business registration number of the fabric supplier, average sales of the fabric supplier for a preset period, the number of transactions of the fabric supplier, a daily production amount of each of the fabrics, the suppliable amount of each of the fabrics, and the number of the types of the fabrics suppliable by the fabric supplier through collaboration with the other fabric supplier, and
   wherein the second screening score is determined according to presence or absence of the DUNS number of the fabric buyer, an average amount of purchase of the fabric buyer for a preset period, the number of transactions of the fabric buyer, the total assets of the fabric buyer, an amount of each of the fabrics purchased by the fabric buyer, and a country or region of the fabric buyer.

3. The method of claim 2, wherein the information about the fabrics includes information about a type of the fabrics supplied, information about a material of the fabrics supplied, information about a color of the fabrics supplied, information about a pattern of the fabrics supplied, information about a width of the fabrics supplied, information about weight of the fabrics supplied, information about a price of the fabrics supplied, information about a sample image of the fabrics supplied, and information about a suppliable amount of the fabrics supplied, the method further comprising:
generating a first vector for each of the at least one second fabric supplier terminal through data preprocessing of the information about the fabrics, the first vector including a value related to the type of the fabrics supplied, a value related to the material of the fabrics supplied, values related to the color and pattern of the fabrics supplied, a value of the width of the fabrics supplied, and a value of the weight of the fabrics supplied;
generating a first reduced vector for the first vector through a principal component analysis;
determining n similar groups by applying a Density-Based Spatial Clustering of Applications with Noise (DBSCAN) technique to the plurality of first reduced vectors for all of the at least one second fabric supplier terminal; and
transmitting different recommendation information for each of the n similar groups,
wherein the recommendation information includes information about a trends of yarn prices, information about yarn companies, information about weaving companies, information about dyeing companies, and information about packaging companies.

4. The method of claim 3, wherein the estimate information includes information about a type of the purchased fabric, information about a material of the purchased fabric, information about a color of the purchased fabric, information about a pattern of the purchased fabric, information about a width of the purchased fabric, and information about weight of the purchased fabric, information about a delivery date of the purchased fabric, and information about the volume of order of the purchased fabric, wherein the fabric export session comprises:
transmitting, to the second fabric buyer terminal and the first supplier group, information about a contract prepared according to the information about the fabric buyer of the second fabric buyer terminal, the information about the fabric suppliers for the first supplier group, the information about the fabrics, and the estimate information;
transmitting a document related to telegraphic transfer according to the information about the contract to the second fabric buyer terminal and the first supplier group;
transmitting information about a work instruction received from the second fabric buyer terminal to the first supplier group;
transmitting work information received from the first supplier group to the second fabric buyer terminal;
transmitting an inspection result for the fabrics received from the first supplier group to the second fabric buyer terminal;
transmitting information about a transport schedule of the fabrics produced by the first supplier group and information about a shipping document to the second fabric buyer terminal;
transmitting information about a document related to a final payment according to the information about the contract to the first supplier group;
transmitting a document related to delivery completion by courier to the first supplier group and the second fabric buyer terminal; and
receiving information about feedback from each of the first supplier group and the second fabric buyer terminal.

5. The method of claim 4, wherein the plurality of neural networks comprises a first neural network and a second neural network,
wherein the first neural network comprises a first input layer, one or more first hidden layers, and a first output layer,
wherein the second neural network comprises a second input layer, one or more second hidden layers, and a second output layer,
the method further comprising:
generating a first base vector for each of the at least one purchased fabric through data preprocessing based on the estimate information, the first base vector including a value related to a type of the purchased fabric, a value related to a material of the purchased fabric, a value related to a color of the purchased fabric, a value related to a pattern of the purchased fabric, a value related to a width of the purchased fabric, a value of weight of the purchased fabric, and a value for the volume of the order of the purchased fabric,
generating a first reference vector for each of the at least one second fabric supplier terminal through data preprocessing based on the information about the fabrics, the first reference vector including the value related to the type of the fabrics supplied, the value related to the material of the fabrics supplied, the value related to the color of the fabrics supplied, the value related to the pattern of the fabrics supplied, the value of the width of the fabrics supplied, and the value of the weight of the fabrics supplied;
based on the first base vector and the first reference vector being input to the first neural network, determining a plurality of third fabric supplier terminals capable of supplying the purchased fabric included in the estimate information;
generating a second base vector including the value for the volume of order of each of the at least one purchased fabric and a value matched to the country or region of the fabric buyer through data preprocessing based on the information about the fabric buyer and the estimate information;
generating an input vector for each of the at least one purchased fabric through data preprocessing based on information about fabric suppliers of the plurality of third fabric supplier terminals, the input vector including identification values for the plurality of third fabric supplier terminals, values matched to countries or regions for the plurality of third fabric supplier terminals, average sales of the plurality of third fabric suppliers for a preset period, the number of transactions of the plurality of third fabric suppliers, an available amount of supply of the plurality of third fabric suppliers, and a value related to collaboration of the plurality of third fabric suppliers;
based on the input vectors and the second base vectors being input to the second neural network, determining a plurality of supplier groups matching the second fabric buyer terminal;
wherein:
each of learning data including the first base vectors, the first reference vectors, and answer similarity is input to the first input layer of the first neural network and output as a first output vector through the one or more first hidden layers and the first output layer;

the first output vector is input to a first loss function layer connected to the first output layer;

the first loss function layer output a first loss value using a first loss function to configured to compare the first output vector and a first answer vector for each of the learning data; and a parameter of the first neural network is trained to reduce the first loss value, wherein:

each of learning data including the plurality of input vectors, the plurality of second base vectors, and a vector for an answer plurality of supplier groups is input to the second input layer of the second neural network, and output as a second output vector through the one or more second hidden layers and the second output layer;

the second output vector is input to a second loss function layer connected to the second output layer;

the second loss function layer outputs a second loss value using a second loss function configured to compare the second output vector and a second answer vector for each of the learning data; and a parameter of the second neural network is trained to reduce the second loss value.

* * * * *